(12) United States Patent
Oboril et al.

(10) Patent No.: US 12,134,379 B2
(45) Date of Patent: Nov. 5, 2024

(54) SYSTEMS, DEVICES, AND METHODS FOR PREDICTIVE RISK-AWARE DRIVING

(71) Applicant: Mobileye Vision Technologies Ltd., Jerusalem (IL)

(72) Inventors: Fabian Oboril, Karlsruhe (DE); Cornelius Buerkle, Karlsruhe (DE)

(73) Assignee: Mobileye Vision Technologies Ltd., Jerusalem (IL)

( * ) Notice: Subject to any disclaimer, the term of this patent is extended or adjusted under 35 U.S.C. 154(b) by 807 days.

(21) Appl. No.: 17/030,402

(22) Filed: Sep. 24, 2020

(65) Prior Publication Data

US 2021/0009121 A1  Jan. 14, 2021

(51) Int. Cl.
*B60W 30/00* (2006.01)
*B60W 30/095* (2012.01)
(Continued)

(52) U.S. Cl.
CPC ........ *B60W 30/0956* (2013.01); *B60W 40/04* (2013.01); *B60W 50/0097* (2013.01);
(Continued)

(58) Field of Classification Search
CPC ............. B60W 30/0956; B60W 40/04; B60W 50/0097; B60W 60/0015;
(Continued)

(56) References Cited

U.S. PATENT DOCUMENTS 9,248,834 B1 * 2/2016 Ferguson .......... B60W 50/0097
11,577,741 B1 * 2/2023 Reschka ............. B60W 50/045
(Continued)

FOREIGN PATENT DOCUMENTS

| EP | 2902291 A1 | 8/2015 | |
| EP | 3598411 A1 * | 1/2020 | ............ B60W 30/09 |
| EP | 3974270 A1 * | 3/2022 | ........ B60W 30/0953 |

OTHER PUBLICATIONS

Shalev-Shwartz et al., "On a Formal Model of Safe and Scalable Self-driving Cars", 2017, 37 pages, Mobileye.
(Continued)

*Primary Examiner* — Peter D Nolan
*Assistant Examiner* — Peter Y Ning
(74) *Attorney, Agent, or Firm* — Finnegan, Henderson, Farabow, Garrett & Dunner, LLP

(57) ABSTRACT

A safety device for a vehicle including a memory configured to store instructions; one or more processors coupled to the memory to execute the instructions stored in the memory, wherein the instructions implement a safety driving model for the vehicle to determine a safety driving state for the vehicle, wherein determining includes obtaining data for one or more objects in a vehicle environment of the vehicle, wherein the data comprises motion data associated with at least one object of the one or more objects; determining a predicted motion trajectory for at least one object of the one or more objects; determining whether a risk indicating a risk of a collision for the vehicle and the at least one or more objects exceeds a predefined risk threshold; and generating an information that the risk exceeds the predefined risk threshold to be considered in determining the safety driving state for the vehicle.

20 Claims, 15 Drawing Sheets

(51) Int. Cl.
*B60W 40/04* (2006.01)
*B60W 50/00* (2006.01)
*B60W 60/00* (2020.01)

(52) U.S. Cl.
CPC .. *B60W 60/0015* (2020.02); *B60W 60/00274* (2020.02); *B60W 2554/4045* (2020.02)

(58) Field of Classification Search
CPC ... B60W 60/00274; B60W 2554/4045; B60W 2554/802; B60W 30/16; B60W 2554/4029; B60W 2554/80; B60W 60/0027; B60W 30/0953; B60W 60/0016; B60W 50/00; B60W 60/00272; B60W 60/00276; B60W 2050/0028; B60W 2554/402; B60W 2554/404
See application file for complete search history.

(56) References Cited

U.S. PATENT DOCUMENTS

| | | | | |
|---|---|---|---|---|
| 2015/0210280 | A1* | 7/2015 | Agnew | B60W 10/192 701/70 |
| 2017/0008518 | A1* | 1/2017 | Arndt | B60W 30/09 |
| 2020/0086855 | A1* | 3/2020 | Packer | G05D 1/0289 |
| 2020/0211394 | A1* | 7/2020 | King | B60W 50/023 |
| 2020/0262423 | A1* | 8/2020 | Oboril | G08G 1/161 |
| 2022/0185267 | A1* | 6/2022 | Beller | B60W 30/0956 |

OTHER PUBLICATIONS

Nistér et al., "The Safety Force Field", 2019, pp. 1-24, NVIDIA Corporation, Santa Clara, CA.

Nistér et al., "An Introduction to the Safety Force Field", 2019, pp. 1-26, NVIDIA Corporation, Santa Clara, CA.

Yoshida, "Intel Gets IEEE to Ask 'How Safe is Safe Enough' for AVs", EE Times, Dec. 19, 2019, 4 pages.

Xu et al., "Calibration aand Evaluation of Responsibility-Sensitive Safety Model on Autonomous Car Following, Maneuvers Using Naturalistic Driving Study Data", Presentation at the 99th Transportation Research Board Annual Meeting, Aug. 2019, 18 pages, Washington D.C.

"Porsche 911 Carrera S 200 kph—0", FastestLaps.com, 2019, 3 pages, retrieved from https://fastestlaps.com/tests/onsup5uf3ssr on Sep. 14, 2020.

"C++ Library for Responsibility Sensitive Safety", GitHub, 2020, 8 pages, Release v4.1.0, retrieved from https://github.com/intel/ad-rss-lib on Sep. 14, 2020.

"CARLA Open-source simulator for autonomous driving research", 2020, 3 pages, CARLA Simulator, retrieved from https://carla.org on Sep. 14, 2020.

Oboril et al., "Risk-Aware Safety Layer for AV Behavior Planning", IEEE Intelligent Vehicles Symposium (IV), Oct. 2020, 7 pages, Las Vegas, NV.

Eggert, "Predictive Risk Estimation for Intelligent ADAS Functions", 17th International IEEE Conference on Intelligent Transportation Systems (ITSC), Oct. 2014, 8 pages, Qingdao, CN.

Eggert et al., "A Foresighted Driver Model derived from Integral Expected Risk", 2019 IEEE Intelligent Transportation Systems Conference (ITSC), Oct. 2019, 8 pages, Auckland, NZ.

Philipp et al., "Analytic Collision Risk Calculation for Autonomous Vehicle Navigation", 2019 International Conference on Robotics and Automation (ICRA), May 2019, 7 pages, IEEE, Montreal, QC, CA.

"Road vehicles—Safety of the intended functionality", UK implementation of ISO/PAS 21448:2019, 2019, 68 pages, The British Standards Institution.

European Search Report issued for the corresponding European patent application No. 21193996.2, dated Feb. 8, 2022, 8 pages (for informational purposes only).

* cited by examiner

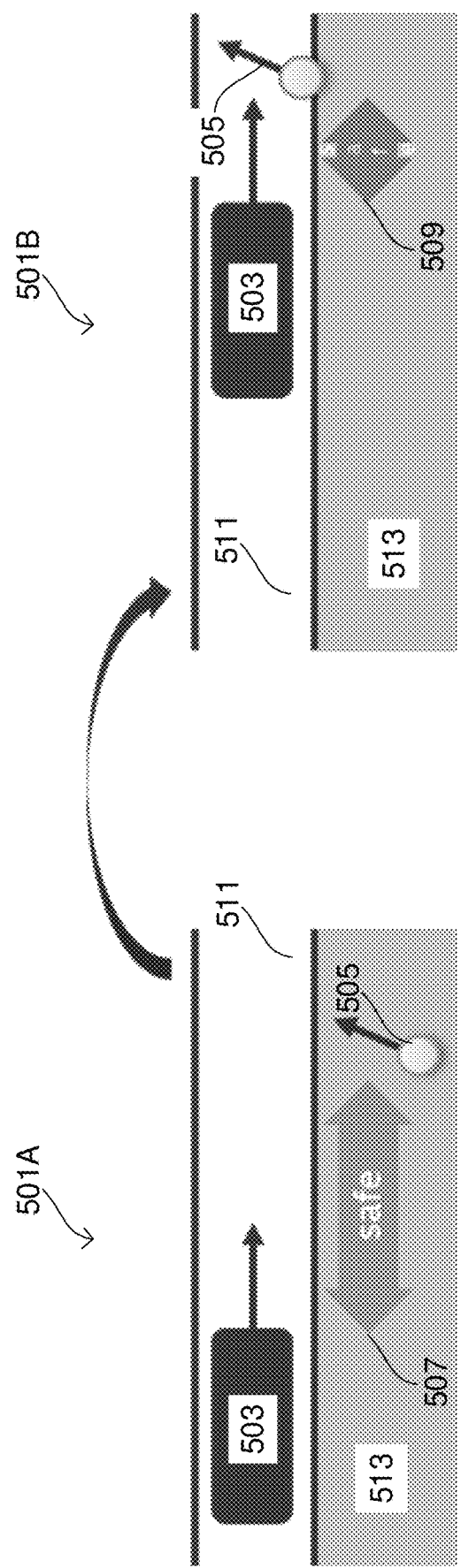

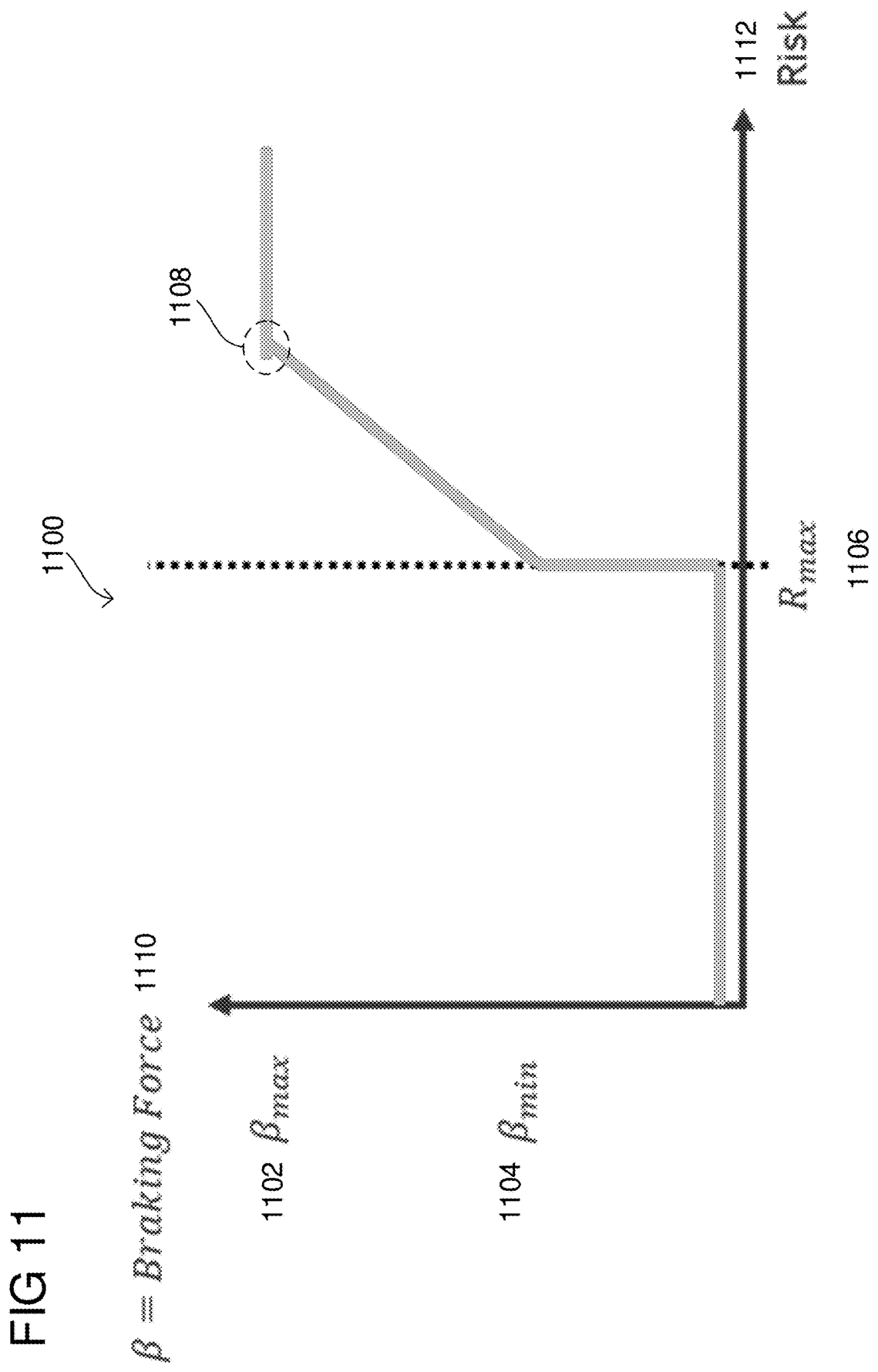

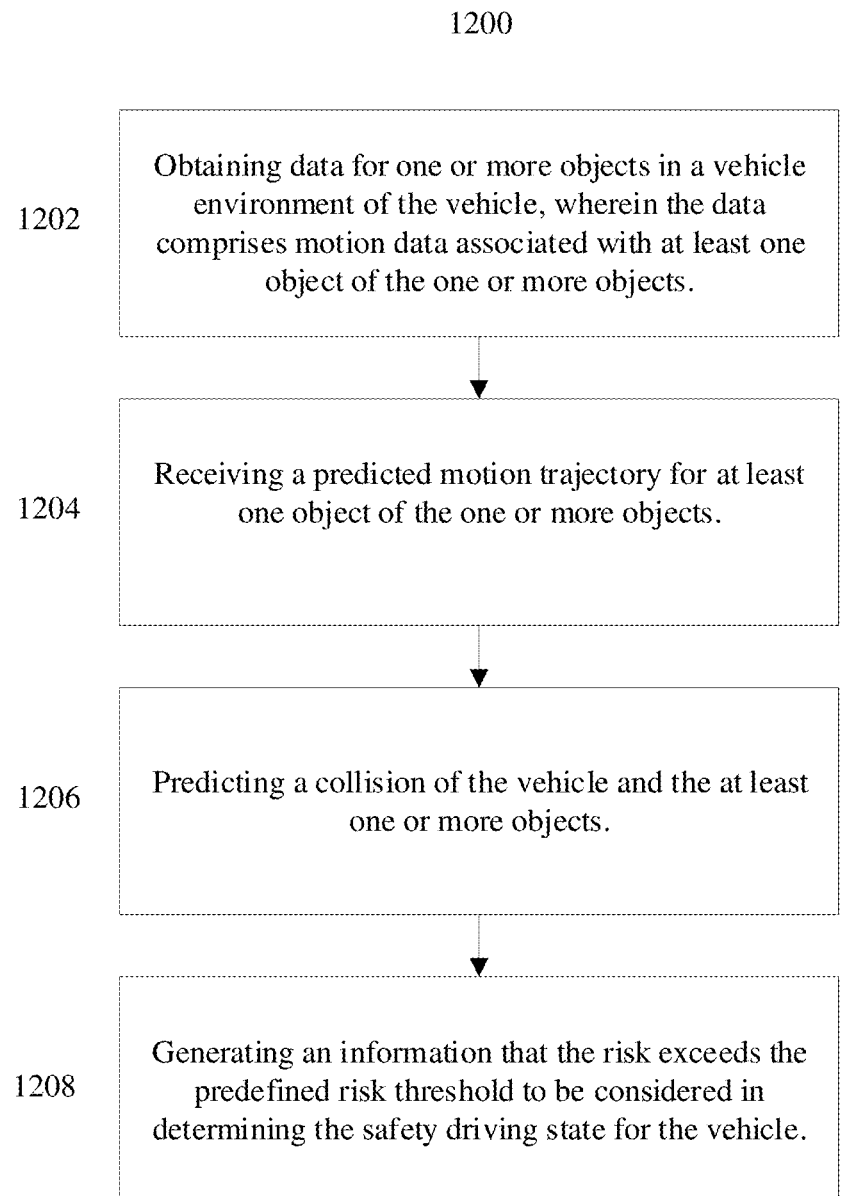

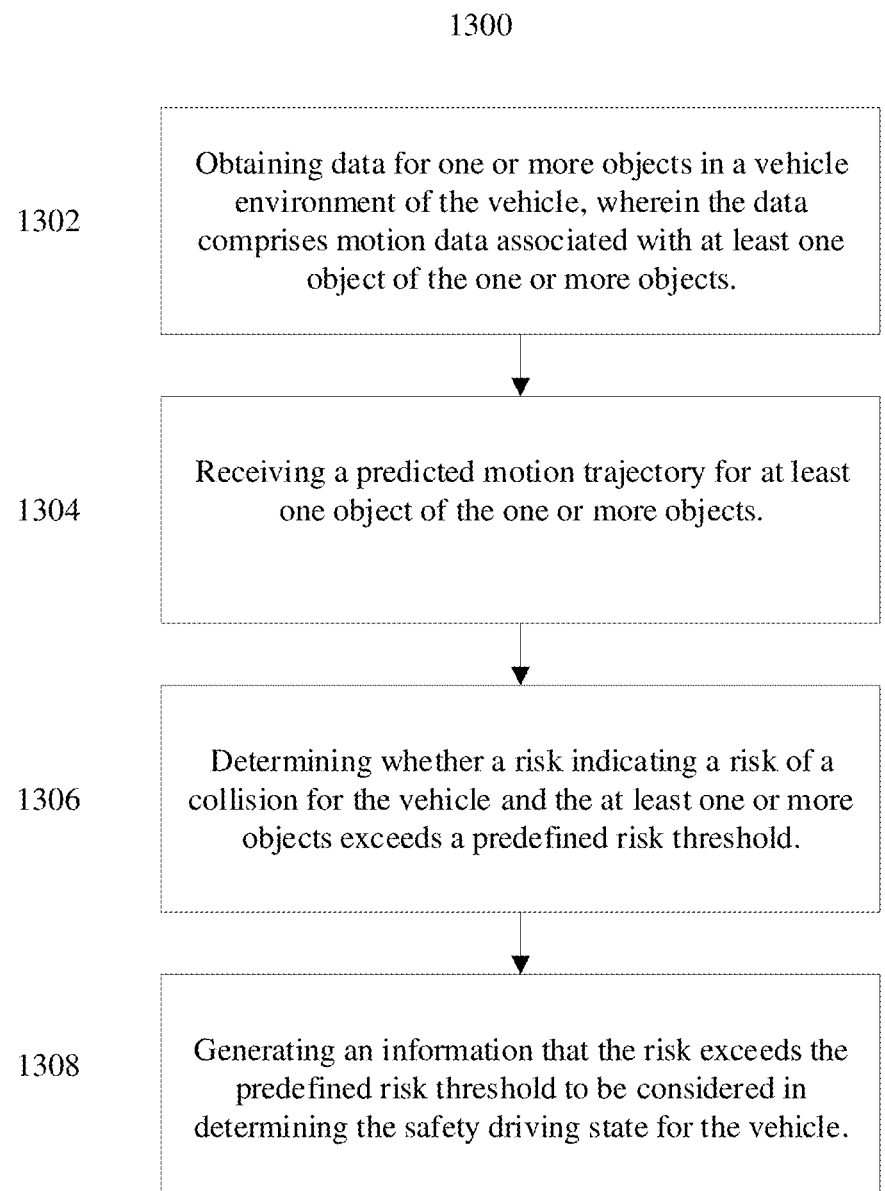

SYSTEMS, DEVICES, AND METHODS FOR PREDICTIVE RISK-AWARE DRIVING

TECHNICAL FIELD

Various aspects of this disclosure generally relate to autonomous driving systems and methods.

BACKGROUND

Autonomous driving utilizes reliable driving control and safety systems that process data acquired at a vehicle. Using data acquired at the vehicle, which may include data about the vehicle's external environment, internal environment, or data about the vehicle itself, the vehicle may alter its movements, modify its positioning with respect to external elements, and/or respond to newly detected events. Additionally, autonomous vehicles may be configured to communicate with other devices, such as other vehicles, network infrastructure elements, wireless devices, etc., to assist in the mobility control, provide faster information processing, and, generally speaking, communicate information in order to improve overall system performance Parameterizable safety driving models for autonomous driving (AD) require representation of the vehicle environment in order to determine whether the vehicle is in a safe or unsafe state. A proper vehicle instruction is generated in response to the determination that the vehicle is in an unsafe state. Safety driving models interpret parameters representing the current vehicle environment to determine the state of the vehicle. For example, models may determine the vehicle is in a safe state based on a distance between the ego vehicle and other traffic participants. However, if the parameters do not represent a potential worst case scenario, the safety driving model may fail to generate a proper vehicle instruction.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. It should be understood that the drawings are diagrammatic and schematic representations of exemplary aspects of the invention, and are neither limitative nor necessarily drawn to scale of the present invention.

In the following description, various aspects of the invention are described with reference to the following drawings, in which:

FIGS. 5A and 5B show exemplary scenarios of an autonomous vehicle safety model failing to avoid a collision.

FIG. 11 shows an adaptive braking force according to some aspects.

FIG. 12 shows a flow chart illustrating an exemplary method of predictive risk aware driving according to some aspects.

FIG. 13 shows a flow chart illustrating an exemplary method of predictive risk aware driving according to some aspects.

DESCRIPTION

Figure 1:
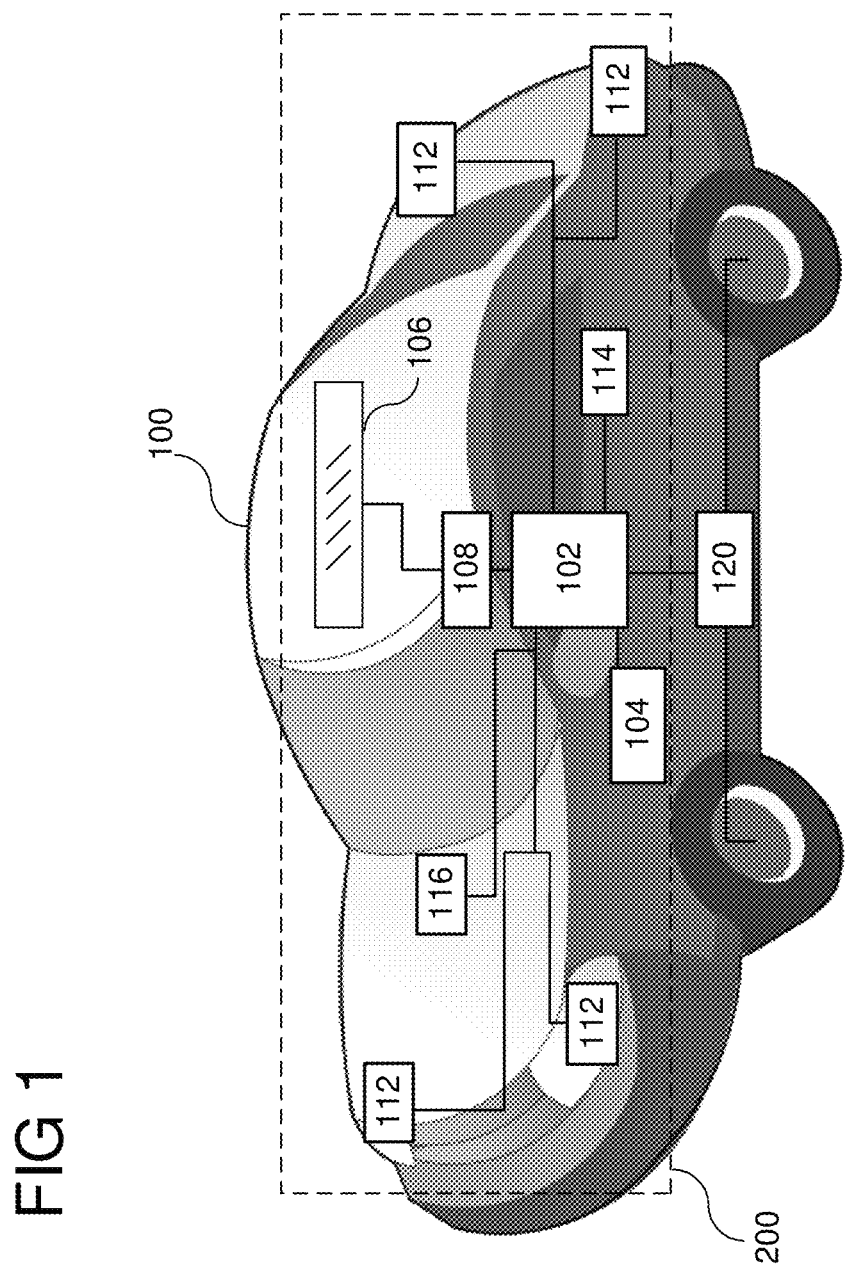
FIG. 1 shows an exemplary autonomous vehicle in accordance with various aspects of the present disclosure.

The following detailed description refers to the accompanying drawings that show, by way of illustration, exemplary details and aspects in which the disclosure may be practiced.

The word "exemplary" is used herein to mean "serving as an example, instance, or illustration". Any aspect or design described herein as "exemplary" is not necessarily to be construed as preferred or advantageous over other aspects or designs.

Throughout the drawings, it should be noted that like reference numbers are used to depict the same or similar elements, features, and structures, unless otherwise noted.

The terms "at least one" and "one or more" may be understood to include a numerical quantity greater than or equal to one (e.g., one, two, three, four, [ . . . ], etc.). The term "a plurality" may be understood to include a numerical quantity greater than or equal to two (e.g., two, three, four, five, [ . . . ], etc.).

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. The phrases "group (of)", "set (of)", "collection (of)", "series (of)", "sequence (of)", "grouping (of)", etc., and the like in the description and in the claims, if any, refer to a quantity equal to or greater than one, i.e., one or more. The phrases "proper subset", "reduced subset", and "lesser subset" refer to a subset of a set that is not equal to the set, illustratively, referring to a subset of a set that contains less elements than the set.

The phrase "at least one of" with regard to a group of elements may be used herein to mean at least one element from the group including the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art.

Any vector and/or matrix notation utilized herein is exemplary in nature and is employed solely for purposes of explanation. Accordingly, aspects of this disclosure accompanied by vector and/or matrix notation are not limited to being implemented solely using vectors and/or matrices, and that the associated processes and computations may be equivalently performed with respect to sets, sequences, groups, etc., of data, observations, information, signals, samples, symbols, elements, etc.

It is appreciated that any vector and/or matrix notation utilized herein is exemplary in nature and is employed solely for purposes of explanation. Accordingly, it is understood that the approaches detailed in this disclosure are not limited to being implemented solely using vectors and/or matrices, and that the associated processes and computations may be equivalently performed with respect to sets, sequences, groups, etc., of data, observations, information, signals, samples, symbols, elements, etc. Furthermore, it is appreciated that references to a "vector" may refer to a vector of any size or orientation, e.g. including a 1×1 vector (e.g. a scalar), a 1×M vector (e.g. a row vector), and an M×1 vector (e.g. a column vector). Similarly, it is appreciated that references to a "matrix" may refer to matrix of any size or orientation, e.g. including a 1×1 matrix (e.g. a scalar), a 1×M matrix (e.g. a row vector), and an M×1 matrix (e.g. a column vector).

The terms "processor" or "controller" as, for example, used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit, and may also be referred to as a "processing circuit," "processing circuitry," among others. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality, among others, and conversely that any single processor, controller, or logic circuit detailed herein may be realized as two (or more) separate entities with equivalent functionality, among others.

As used herein, "memory" is understood as a computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, among others, or any combination thereof. Registers, shift registers, processor registers, data buffers, among others, are also embraced herein by the term memory. The term "software" refers to any type of executable instruction, including firmware.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

A "vehicle" may be understood to include any type of driven or drivable object. By way of example, a vehicle may be a driven object with a combustion engine, a reaction engine, an electrically driven object, a hybrid driven object, or a combination thereof. A vehicle may be or may include an automobile, a bus, a mini bus, a van, a truck, a mobile home, a vehicle trailer, a motorcycle, a bicycle, a tricycle, a train locomotive, a train wagon, a moving robot, a personal transporter, a boat, a ship, a submersible, a submarine, a drone, an aircraft, a rocket, and the like.

A "ground vehicle" may be understood to include any type of vehicle, as described above, which is configured to traverse or be driven on the ground, e.g., on a street, on a road, on a track, on one or more rails, off-road, etc. An "aerial vehicle" may be understood to be any type of vehicle, as described above, which is capable of being maneuvered above the ground for any duration of time, e.g., a drone. Similar to a ground vehicle having wheels, belts, etc., for providing mobility on terrain, an "aerial vehicle" may have one or more propellers, wings, fans, among others, for providing the ability to maneuver in the air. An "aquatic vehicle" may be understood to be any type of vehicle, as described above, which is capable of being maneuvers on or below the surface of liquid, e.g., a boat on the surface of water or a submarine below the surface. It is appreciated that some vehicles may be configured to operate as one of more of a ground, an aerial, and/or an aquatic vehicle.

The term "autonomous vehicle" may describe a vehicle capable of implementing at least one navigational change without driver input. A navigational change may describe or include a change in one or more of steering, braking, or acceleration/deceleration of the vehicle. A vehicle may be described as autonomous even in case the vehicle is not fully automatic (e.g., fully operational with driver or without driver input). Autonomous vehicles may include those vehicles that can operate under driver control during certain time periods and without driver control during other time periods. Autonomous vehicles may also include vehicles that control only some aspects of vehicle navigation, such as steering (e.g., to maintain a vehicle course between vehicle lane constraints) or some steering operations under certain circumstances (but not under all circumstances), but may leave other aspects of vehicle navigation to the driver (e.g., braking or braking under certain circumstances). Autonomous vehicles may also include vehicles that share the control of one or more aspects of vehicle navigation under certain circumstances (e.g., hands-on, such as responsive to a driver input) and vehicles that control one or more aspects of vehicle navigation under certain circumstances (e.g., hands-off, such as independent of driver input). Autonomous vehicles may also include vehicles that control one or more aspects of vehicle navigation under certain circumstances, such as under certain environmental conditions (e.g., spatial areas, roadway conditions). In some aspects, autonomous vehicles may handle some or all aspects of braking, speed control, velocity control, and/or steering of the vehicle. An autonomous vehicle may include those vehicles that can operate without a driver. The level of autonomy of a vehicle may be described or determined by the Society of Automotive Engineers (SAE) level of the vehicle (e.g., as defined by the SAE, for example in SAE J3016 2018: Taxonomy and definitions for terms related to driving automation systems for on road motor vehicles) or by other relevant professional organizations. The SAE level may have a value ranging from a minimum level, e.g. level 0 (illustratively, substantially no driving automation), to a maximum level, e.g. level 5 (illustratively, full driving automation).

In the context of the present disclosure, "vehicle operation data" may be understood to describe any type of feature related to the operation of a vehicle. By way of example, "vehicle operation data" may describe the status of the vehicle such as the type of propulsion unit(s), types of tires or propellers of the vehicle, the type of vehicle, and/or the age of the manufacturing of the vehicle. More generally, "vehicle operation data" may describe or include static features or static vehicle operation data (illustratively, features or data not changing over time). As another example, additionally or alternatively, "vehicle operation data" may describe or include features changing during the operation of the vehicle, for example, environmental conditions, such as weather conditions or road conditions during the operation of the vehicle, fuel levels, fluid levels, operational parameters of the driving source of the vehicle, etc. More generally, "vehicle operation data" may describe or include varying features or varying vehicle operation data (illustratively, time-varying features or data).

Various aspects herein may utilize one or more machine learning models to perform or control functions of the vehicle (or other functions described herein). The term "model" as, for example, used herein may be understood as any kind of algorithm, which provides output data from input data (e.g., any kind of algorithm generating or calculating output data from input data). A machine learning model may be executed by a computing system to progressively improve performance of a specific task. In some aspects, parameters of a machine learning model may be adjusted during a training phase based on training data. A trained machine learning model may be used during an inference phase to make predictions or decisions based on input data. In some aspects, the trained machine learning model may be used to generate additional training data. An additional machine learning model may be adjusted during a second training phase based on the generated additional training data. A trained additional machine learning model may be used during an inference phase to make predictions or decisions based on input data.

The machine learning models described herein may take any suitable form or utilize any suitable technique (e.g., for training purposes). For example, any of the machine learning models may utilize supervised learning, semi-supervised learning, unsupervised learning, or reinforcement learning techniques.

In supervised learning, the model may be built using a training set of data including both the inputs and the corresponding desired outputs (illustratively, each input may be associated with a desired or expected output for that input). Each training instance may include one or more inputs and a desired output. Training may include iterating through training instances and using an objective function to teach the model to predict the output for new inputs (illustratively, for inputs not included in the training set). In semi-supervised learning, a portion of the inputs in the training set may be missing the respective desired outputs (e.g., one or more inputs may not be associated with any desired or expected output).

In unsupervised learning, the model may be built from a training set of data including only inputs and no desired outputs. The unsupervised model may be used to find structure in the data (e.g., grouping or clustering of data points), illustratively, by discovering patterns in the data. Techniques that may be implemented in an unsupervised learning model may include, e.g., self-organizing maps, nearest-neighbor mapping, k-means clustering, and singular value decomposition.

Reinforcement learning models may include positive or negative feedback to improve accuracy. A reinforcement learning model may attempt to maximize one or more objectives/rewards. Techniques that may be implemented in a reinforcement learning model may include, e.g., Q-learning, temporal difference (TD), and deep adversarial networks.

Various aspects described herein may utilize one or more classification models. In a classification model, the outputs may be restricted to a limited set of values (e.g., one or more classes). The classification model may output a class for an input set of one or more input values. An input set may include sensor data, such as image data, radar data, LIDAR data and the like. A classification model as described herein may, for example, classify certain driving conditions and/or environmental conditions, such as weather conditions, road conditions, and the like. References herein to classification models may contemplate a model that implements, e.g., any one or more of the following techniques: linear classifiers (e.g., logistic regression or naive Bayes classifier), support vector machines, decision trees, boosted trees, random forest, neural networks, or nearest neighbor.

Various aspects described herein may utilize one or more regression models. A regression model may output a numerical value from a continuous range based on an input set of one or more values (illustratively, starting from or using an input set of one or more values). References herein to regression models may contemplate a model that implements, e.g., any one or more of the following techniques (or other suitable techniques): linear regression, decision trees, random forest, or neural networks.

A machine learning model described herein may be or may include a neural network. The neural network may be any kind of neural network, such as a convolutional neural network, an autoencoder network, a variational autoencoder network, a sparse autoencoder network, a recurrent neural network, a deconvolutional network, a generative adversarial network, a forward-thinking neural network, a sum-product neural network, and the like. The neural network may include any number of layers. The training of the neural network (e.g., adapting the layers of the neural network) may use or may be based on any kind of training principle, such as backpropagation (e.g., using the backpropagation algorithm).

Throughout the present disclosure, the following terms may be used as synonyms: driving parameter set, driving model parameter set, safety layer parameter set, driver assistance, automated driving model parameter set, and/or the like (e.g., driving safety parameter set). These terms may correspond to groups of values used to implement one or more models for directing a vehicle to operate according to the manners described herein.

Furthermore, throughout the present disclosure, the following terms may be used as synonyms: driving parameter, driving model parameter, safety layer parameter, driver assistance and/or automated driving model parameter, and/or the like (e.g., driving safety parameter), and may correspond to specific values within the previously described sets.

FIG. 1 shows a vehicle 100 including a mobility system 120 and a control system 200 (see also FIG. 2) in accordance with various aspects. It is appreciated that vehicle 100 and control system 200 are exemplary in nature and may thus be simplified for explanatory purposes. For example, while vehicle 100 is depicted as a ground vehicle, aspects of this disclosure may be equally or analogously applied to aerial vehicles such as drones or aquatic vehicles such as boats. Furthermore, the quantities and locations of elements, as well as relational distances (as discussed above, the figures are not to scale) are provided as examples and are not limited thereto. The components of vehicle 100 may be arranged around a vehicular housing of vehicle 100, mounted on or outside of the vehicular housing, enclosed within the vehicular housing, or any other arrangement relative to the vehicular housing where the components move with vehicle 100 as it travels. The vehicular housing, such as an automobile body, drone body, plane or helicopter fuselage, boat hull, or similar type of vehicular body, is dependent on the type of vehicle that vehicle 100 is.

In addition to including a control system 200, vehicle 100 may also include a mobility system 120. Mobility system 120 may include components of vehicle 100 related to steering and movement of vehicle 100. In some aspects, where vehicle 100 is an automobile, for example, mobility system 120 may include wheels and axles, a suspension, an engine, a transmission, brakes, a steering wheel, associated electrical circuitry and wiring, and any other components used in the driving of an automobile. In some aspects, where vehicle 100 is an aerial vehicle, mobility system 120 may include one or more of rotors, propellers, jet engines, wings, rudders or wing flaps, air brakes, a yoke or cyclic, associated electrical circuitry and wiring, and any other components used in the flying of an aerial vehicle. In some aspects, where vehicle 100 is an aquatic or sub-aquatic vehicle, mobility system 120 may include any one or more of rudders, engines, propellers, a steering wheel, associated electrical circuitry and wiring, and any other components used in the steering or movement of an aquatic vehicle. In some aspects, mobility system 120 may also include autonomous driving functionality, and accordingly may include an interface with one or more processors 102 configured to perform autonomous driving computations and decisions and an array of sensors for movement and obstacle sensing. In this sense, the mobility system 120 may be provided with instructions to direct the navigation and/or mobility of vehicle 100 from one or more components of the control system 200. The autonomous driving components of mobility system 120 may also interface with one or more radio frequency (RF) transceivers 108 to facilitate mobility coordination with other nearby vehicular communication devices and/or central networking components that perform decisions and/or computations related to autonomous driving.

Figure 2:
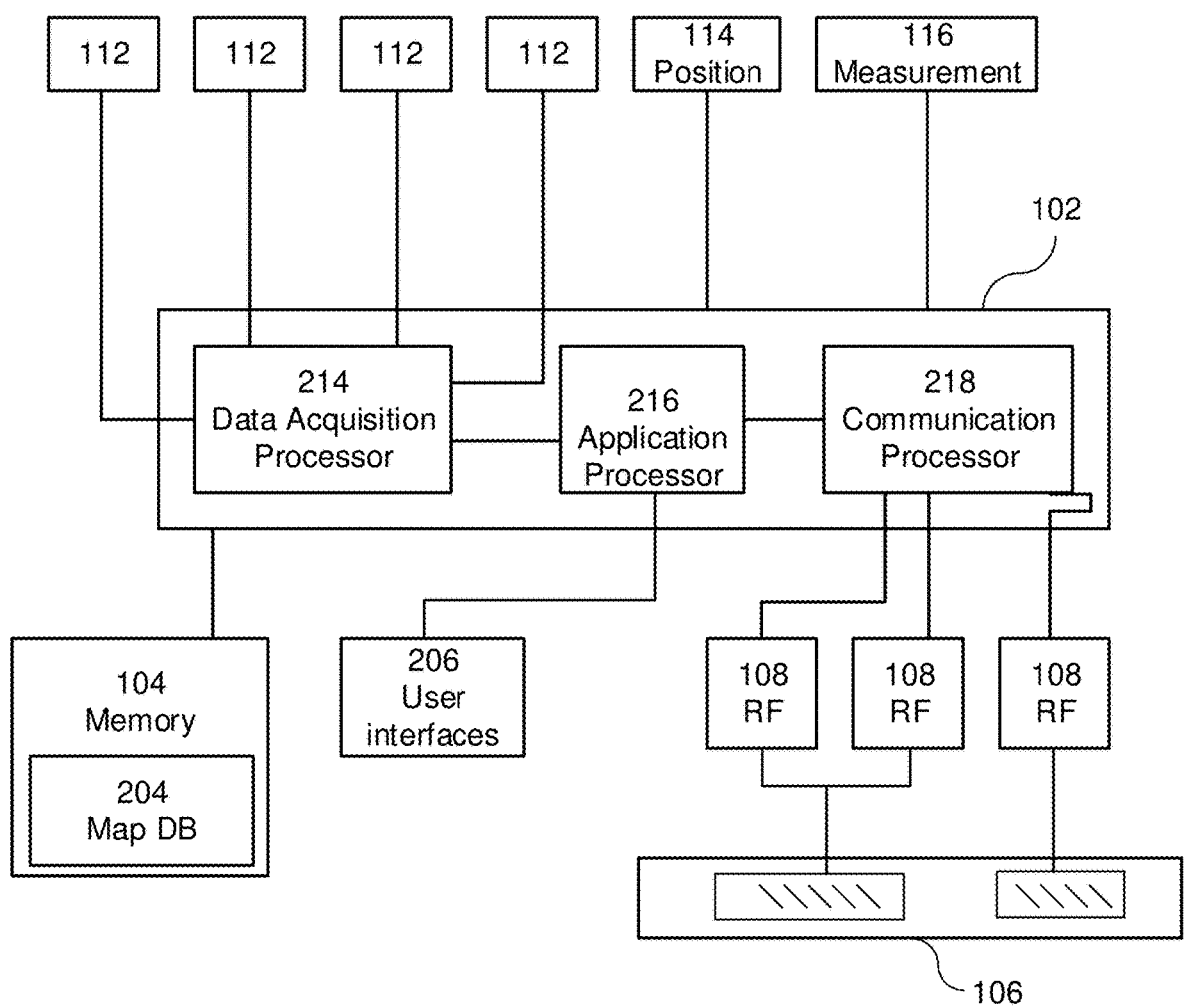
FIG. 2 shows various exemplary electronic components of a safety system of the vehicle in accordance with various aspects of the present disclosure.

The control system 200 may include various components depending on the requirements of a particular implementation. As shown in FIG. 1 and FIG. 2, the control system 200 may include one or more processors 102, one or more memories 104, an antenna system 106 which may include one or more antenna arrays at different locations on the vehicle for radio frequency (RF) coverage, one or more radio frequency (RF) transceivers 108, one or more data acquisition devices 112, one or more position devices 114 which may include components and circuitry for receiving and determining a position based on a Global Navigation Satellite System (GNSS) and/or a Global Positioning System (GPS), and one or more measurement sensors 116, e.g. speedometer, altimeter, gyroscope, velocity sensors, etc.

The control system 200 may be configured to control the vehicle's 100 mobility via mobility system 120 and/or interactions with its environment, e.g. communications with other devices or network infrastructure elements (NIEs) such as base stations, via data acquisition devices 112 and the radio frequency communication arrangement including the one or more RF transceivers 108 and antenna system 106.

The one or more processors 102 may include a data acquisition processor 214, an application processor 216, a communication processor 218, and/or any other suitable processing device. Each processor 214, 216, 218 of the one or more processors 102 may include various types of hardware-based processing devices. By way of example, each processor 214, 216, 218 may include a microprocessor, pre-processors (such as an image pre-processor), graphics processors, a central processing unit (CPU), support circuits, digital signal processors, integrated circuits, memory, or any other types of devices suitable for running applications and for image processing and analysis. In some aspects, each processor 214, 216, 218 may include any type of single or multi-core processor, mobile device microcontroller, CPU, etc. These processor types may each include multiple processing units with local memory and instruction sets. Such processors may include video inputs for receiving image data from multiple image sensors and may also include video out capabilities.

Any of the processors 214, 216, 218 disclosed herein may be configured to perform certain functions in accordance with program instructions which may be stored in a memory of the one or more memories 104. In other words, a memory of the one or more memories 104 may store software that, when executed by a processor (e.g., by the one or more processors 102), controls the operation of the system, e.g., a driving and/or safety system. A memory of the one or more memories 104 may store one or more databases and image processing software, as well as a trained system, such as a neural network, or a deep neural network, for example. The one or more memories 104 may include any number of random-access memories, read only memories, flash memories, disk drives, optical storage, tape storage, removable storage and other types of storage. Alternatively, each of processors 214, 216, 218 may include an internal memory for such storage.

The data acquisition processor 214 may include processing circuitry, such as a CPU, for processing data acquired by data acquisition units 112. For example, if one or more data acquisition units are image acquisition units, e.g. one or more cameras, then the data acquisition processor may include image processors for processing image data using the information obtained from the image acquisition units as an input. The data acquisition processor 214 may therefore be configured to create voxel maps detailing the surrounding of the vehicle 100 based on the data input from the data acquisition units 112, i.e., cameras in this example.

Application processor 216 may be a CPU, and may be configured to handle the layers above the protocol stack, including the transport and application layers. Application processor 216 may be configured to execute various applications and/or programs of vehicle 100 at an application layer of vehicle 100, such as an operating system (OS), a user interfaces (UIs) 206 for supporting user interaction with vehicle 100, and/or various user applications. Application processor 216 may interface with communication processor 218 and act as a source (in the transmit path) and a sink (in the receive path) for user data, such as voice data, audio/video/image data, messaging data, application data, basic Internet/web access data, etc.

In the transmit path, communication processor 218 may therefore receive and process outgoing data provided by application processor 216 according to the layer-specific functions of the protocol stack, and provide the resulting data to digital signal processor 208. Communication processor 218 may then perform physical layer processing on the received data to produce digital baseband samples, which digital signal processor may provide to RF transceiver(s) 108. RF transceiver(s) 108 may then process the digital baseband samples to convert the digital baseband samples to analog RF signals, which RF transceiver(s) 108 may wirelessly transmit via antenna system 106. In the receive path, RF transceiver(s) 108 may receive analog RF signals from antenna system 106 and process the analog RF signals to obtain digital baseband samples. RF transceiver(s) 108 may provide the digital baseband samples to communication processor 218, which may perform physical layer processing on the digital baseband samples. Communication processor 218 may then provide the resulting data to other processors of the one or more processors 102, which may process the resulting data according to the layer-specific functions of the protocol stack and provide the resulting incoming data to application processor 216. Application processor 216 may then handle the incoming data at the application layer, which can include execution of one or more application programs with the data and/or presentation of the data to a user via one or more user interfaces 206. User interfaces 206 may include one or more screens, microphones, mice, touchpads, keyboards, or any other interface providing a mechanism for user input or communication to the user (e.g., notifications to the user). Although various practical designs may include separate communication components for each supported radio communication technology (e.g., a separate antenna, RF transceiver, digital signal processor, and controller), for purposes of conciseness, the configuration of vehicle 100 shown in FIGS. 1 and 2 may depict only a single instance of such components.

Communication processor 218 may be configured to implement one or more vehicle-to-everything (V2X) communication protocols, which may include vehicle-to-vehicle (V2V), vehicle-to-infrastructure (V2I), vehicle-to-network (V2N), vehicle-to-pedestrian (V2P), vehicle-to-device (V2D), vehicle-to-grid (V2G), and other protocols. Communication processor 218 may be configured to transmit communications including communications (one-way or two-way) between the vehicle 100 and one or more other (target) vehicles in an environment of the vehicle 100 (e.g., to facilitate coordination of navigation of the vehicle 100 in view of or together with other (target) vehicles in the environment of the vehicle 100), or even a broadcast transmission to unspecified recipients in a vicinity of the transmitting vehicle 100.

Memory 214 may embody a memory component of vehicle 100, such as a hard drive or another such permanent memory device. Although not explicitly depicted in FIGS. 1 and 2, the various other components of vehicle 100, e.g. one or more processors 102, shown in FIGS. 1 and 2 may additionally each include integrated permanent and non-permanent memory components, such as for storing software program code, buffering data, etc.

Data acquisition devices 112 may include any number of data acquisition devices and components depending on the requirements of a particular application. This may include: image acquisition devices, proximity detectors, acoustic sensors, infrared sensors, piezoelectric sensors, etc., for providing data about the vehicle's environment (both outside and inside the vehicle). Image acquisition devices may include cameras (e.g., standard cameras, digital cameras, video cameras, single-lens reflex cameras, infrared cameras, stereo cameras, etc.), charge coupling devices (CCDs) or any type of image sensor. Proximity detectors may include radar sensors, light detection and ranging (LIDAR) sensors, mmWave radar sensors, etc. Acoustic sensors may include: microphones, sonar sensors, ultrasonic sensors, etc. Accordingly, each of the data acquisition units may be configured to observe a particular type of data of the vehicle's 100 environment and forward the data to the data acquisition processor 214 in order to provide the vehicle with an accurate portrayal of the vehicle's environment. The data acquisition devices 112 may be configured to implement pre-processed sensor data, such as radar target lists or LIDAR target lists, in conjunction with acquired data.

Measurement devices 116 may include other devices for measuring vehicle-state parameters, such as a velocity sensor (e.g., a speedometer) for measuring a velocity of the vehicle 100, one or more accelerometers (either single axis or multi-axis) for measuring accelerations of the vehicle 100 along one or more axes, a gyroscope for measuring orientation and/or angular velocity, odometers, altimeters, thermometers, etc. It is appreciated that vehicle 100 may have different measurement devices 116 depending on the type of vehicle it is, e.g., car vs. drone vs. boat.

One or more position devices 114 may include components for determining a position of the vehicle 100. For example, this may include global position system (GPS) or global navigation satellite system (GNSS) circuitry configured to receive signals from a satellite system and determine a position of the vehicle 100. Position devices 114, accordingly, may provide vehicle 100 with satellite navigation features.

The one or more memories 104 may store data, e.g., in a database or in any different format, that may correspond to a map. For example, the map may indicate a location of known landmarks, roads, paths, network infrastructure elements, or other elements of the vehicle's 100 environment. The one or more processors 102 may process sensory information (such as images, radar signals, depth information from LIDAR, or stereo processing of two or more images) of the environment of the vehicle 100 together with position information, such as one or more GPS coordinates, a vehicle's ego-motion, etc., to determine a current location of the vehicle 100 relative to the known landmarks, and refine the determination of the vehicle's location. Certain aspects of this technology may be included in a localization technology such as a mapping and routing model.

The map database (DB) 204 may include any type of database storing (digital) map data for the vehicle 100, e.g., for the control system 200. The map database 204 may include data relating to the position, in a reference coordinate system, of various items, including roads, water features, geographic features, businesses, points of interest, restaurants, gas stations, etc. The map database 204 may store not only the locations of such items, but also descriptors relating to those items, including, for example, names associated with any of the stored features. In some aspects, a processor of the one or more processors 102 may download information from the map database 204 over a wired or wireless data connection to a communication network (e.g., over a cellular network and/or the Internet, etc.). In some cases, the map database 204 may store a sparse data model including polynomial representations of certain road features (e.g., lane markings) or target trajectories for the vehicle 100. The map database 204 may also include stored representations of various recognized landmarks that may be provided to determine or update a known position of the vehicle 100 with respect to a target trajectory. The landmark representations may include data fields such as landmark type, landmark location, among other potential identifiers.

Furthermore, the control system 200 may include a driving model, e.g., implemented in an advanced driving assistance system (ADAS) and/or a driving assistance and automated driving system. By way of example, the control system 200 may include (e.g., as part of the driving model) a computer implementation of a formal model such as a safety driving model. A safety driving model may be or include a mathematical model formalizing an interpretation of applicable laws, standards, policies, etc. that are applicable to self-driving vehicles. A safety driving model may be designed to achieve, e.g., three goals: first, the interpretation of the law should be sound in the sense that it complies with how humans interpret the law; second, the interpretation should lead to a useful driving policy, meaning it will lead to an agile driving policy rather than an overly-defensive driving which inevitably would confuse other human drivers and will block traffic and in turn limit the scalability of system deployment; and third, the interpretation should be efficiently verifiable in the sense that it can be rigorously proven that the self-driving (autonomous) vehicle correctly implements the interpretation of the law. A safety driving model, illustratively, may be or include a mathematical model for safety assurance that enables identification and performance of proper responses to dangerous situations such that self-perpetrated accidents can be avoided.

As described above, the vehicle 100 may include the control system 200 as also described with reference to FIG. 2. The vehicle 100 may include the one or more processors 102 integrated with or separate from an electronic control unit (ECU) which may be included in the mobility system 120 of the vehicle 100. The control system 200 may, in general, generate data to control or assist to control the ECU and/or other components of the vehicle 100 to directly or indirectly control the movement of the vehicle 100 via mobility system 120. The one or more processors 102 of the vehicle 100 may be configured to implement the aspects and methods described herein.

The components illustrated in FIGS. 1 and 2 may be operatively connected to one another via any appropriate interfaces. Furthermore, it is appreciated that not all the connections between the components are explicitly shown, and other interfaces between components may be covered within the scope of this disclosure.

Figure 3:
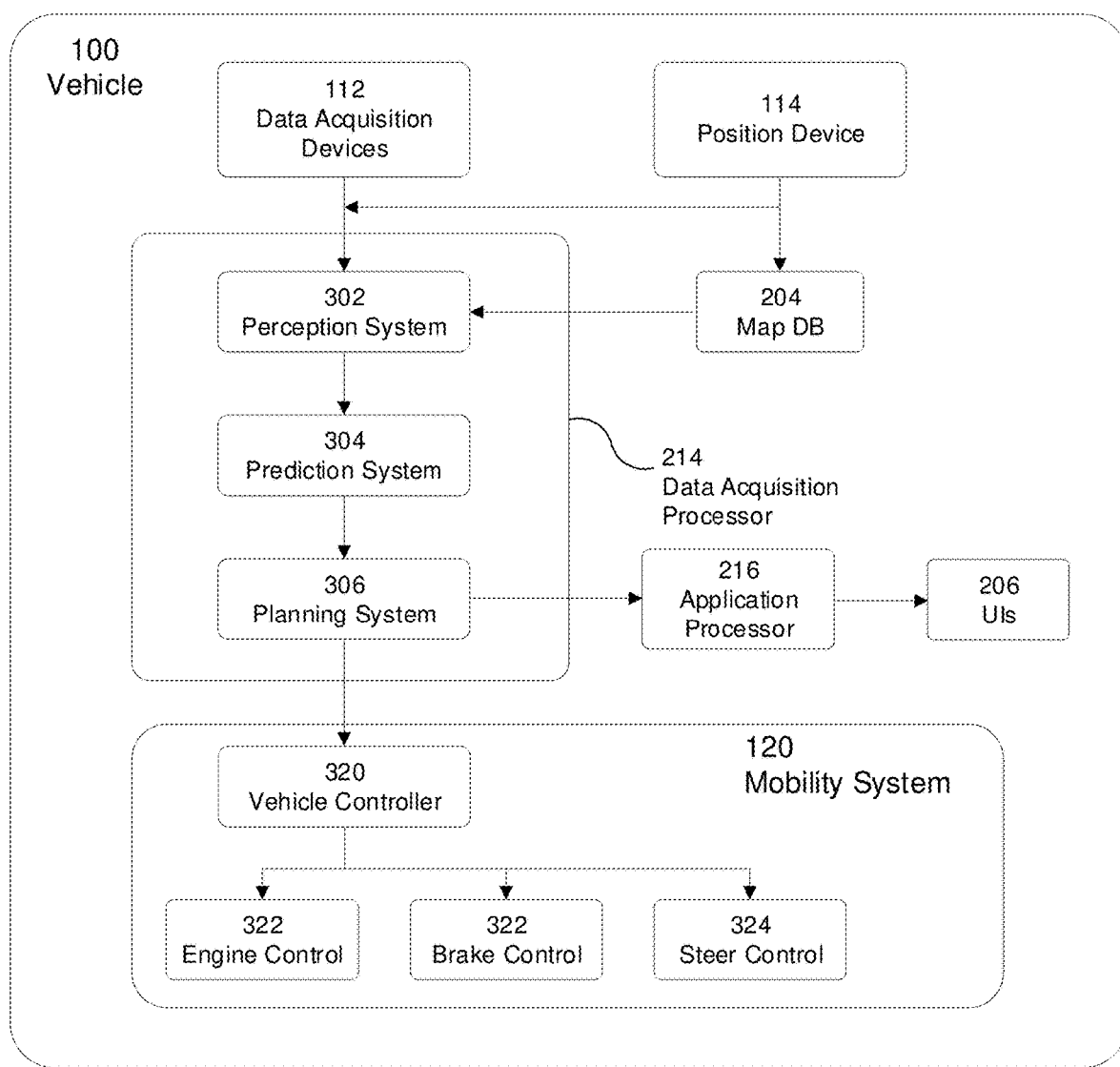
FIG. 3 shows an exemplary diagram of a vehicle according to some aspects.

FIG. 3 shows an exemplary block diagram 300 of a vehicle 100 with a focus placed on several components according to some aspects. Vehicle 100 may be capable of sensing its environment and/or sense changes inside the vehicle and navigate without direct human input and/or provide notifications to occupants of the vehicle.

The one or more data acquisition processors 214 may include a perception system 302, a prediction system 304, and a planning system 306 that cooperate to perceive the external (i.e., outside of the vehicle) and/or internal (i.e., inside of the vehicle) environment of vehicle 100 and determine a plan for controlling the mobility or positioning of vehicle 100 and/or issue notifications to one or more occupants.

The perception system 302 can receive data from the one or more data acquisition devices 112 that are coupled to or otherwise included within the vehicle 100. As examples, the one or more data acquisition devices 112 may include one or more cameras to provide data in one or more modalities (e.g., color, infrared, depth, etc.), a LIDAR system, a radar system, and/or other data acquisition devices. The data can include information that describes the location of objects within the surrounding and/or internal environment of vehicle 100.

For example, for one or more cameras, various processing techniques (e.g., range imaging techniques such as, for example, structure from motion, structured light, stereo triangulation, and/or other techniques) can be performed to identify the location (e.g., in three-dimensional space relative to the one or more cameras) of a number of points that correspond to objects that are depicted in imagery captured by the one or more cameras. Other sensor systems can identify the location of points that correspond to objects as well.

The one or more position devices 114 may be any device or circuitry for determining the position of vehicle 100 (e.g., GPS, GNSS, triangulation methods with respect to terrestrial communication devices, etc.) and provide information to map DB 204 and/or perception system 302.

The data acquisition devices 112 and position devices 114 may therefore be used to collect data that includes information that describes the location (e.g., in three-dimensional space relative to vehicle 100) of points that correspond to objects within the surrounding and/or internal environment of vehicle 100.

In addition to the data from one or more data acquisition devices 112, the perception system 302 may retrieve or otherwise obtain map data from the map DB 204 that provides detailed information about the surrounding environment of the vehicle 100. The map DB 204 data may provide information regarding: the identity and location of different travel paths (e.g., roadways), road segments, buildings, or other items or objects (e.g., street lights, crosswalks, etc.); the location and directions of traffic lanes (e.g., the location and direction of a parking lane, a turning lane, a bicycle lane, or other lanes within a particular road); traffic control data (e.g., the location and instructions of signage, traffic lights, or other traffic control devices); and/or any other map data that provides information that assists the one or more processors 102 of vehicle 100 in monitoring and communicating with its external and/or internal environment.

The perception system 302 may identify one or more objects/features that may affect the control of vehicle 100 based on data received from the one or more one or more data acquisition devices 112 and/or the map DB 204. For example, according to some aspects, the perception system 302 may monitor an internal environment of the vehicle 100 and determine, for each object/feature, state data that describes a current state of such object as described. As examples, the state data for each object may describe an estimate of the object's: current location or position; current speed or velocity; current acceleration; current heading; current orientation; size/footprint (e.g., as represented by a bounding shape such as a bounding polygon or polyhedron); yaw rate; and/or other state information. According to some aspects, the perception system 302 may determine state data for each object/feature over a number of iterations and/or frames. In particular, the perception system 302 may update the state data for each object at each iteration or frame. Thus, the perception system 302 may detect and track objects and/or features (e.g., external to the vehicle such as other vehicles, internal to the vehicle such as people, etc.) over time. The perception system 302 may implement one or more machine learning models in order to perform these tasks.

The prediction system 304 may receive the state data from the perception system 302 and predict one or more future locations for each object based on such state data. For example, the prediction system 304 may predict where each object will be located within the next 1 second, 2 seconds, 10 seconds, etc. For example, an object may be predicted to adhere to its current trajectory according to its current velocity and/or acceleration. However, other more sophisticated prediction techniques or modeling may be implemented.

The planning system 306 may determine one or more plans for the vehicle 100 based at least in part on the perceived and/or predicted one or more future locations for the object and/or the state data for the object provided by the perception system 302 or prediction system 304. In other words, given information about the current locations of perceived objects and/or predicted future locations of the perceived objects, the planning system 306 may determine a plan for the vehicle 100 that best responds to or navigates the vehicle 100 relative to the objects at their current and/or future locations.

The planning system 306 may provide a plan to a vehicle controller 320 of the mobility system 120 that controls one or more vehicle controls such as Engine Control 322, Brake Control 324, and/or Steer Control 326 to execute the plan. The vehicle controller 320 may generate one or more vehicle control signals for the autonomous vehicle based at least in part on an output of the planning system 306. The planning system 306 may additionally or alternatively provide a notification to the Application Processor 216 to communicate via one or more UIs 206.

Each of the perception system 302, the prediction system 304, the planning system 306, and the vehicle controller 320 may include computer logic utilized to provide the desired functionality as discussed herein. According to some aspects, each of the perception system 302, the prediction system 304, the planning system 306, and the vehicle controller 320 may be implemented in hardware, firmware, and/or software controlling a general-purpose processor. For example, according to some aspects, each of the perception system 302, the prediction system 304, the planning system 306, and the vehicle controller 320 may include program instructions or files stored on a storage device, loaded into a memory and executed by one or more processors. In other aspects, each of the perception system 302, the prediction system 304, the planning system 306, and the vehicle controller 320 may include one or more sets of computer-executable instructions that are stored in a non-transitory computer-readable storage medium.

In various implementations, one or more of perception system 302, the prediction system 304, and/or the planning system 306 can include, or otherwise leverage, one or more machine learning models such as, for example, convolutional neural networks.

Figure 4:
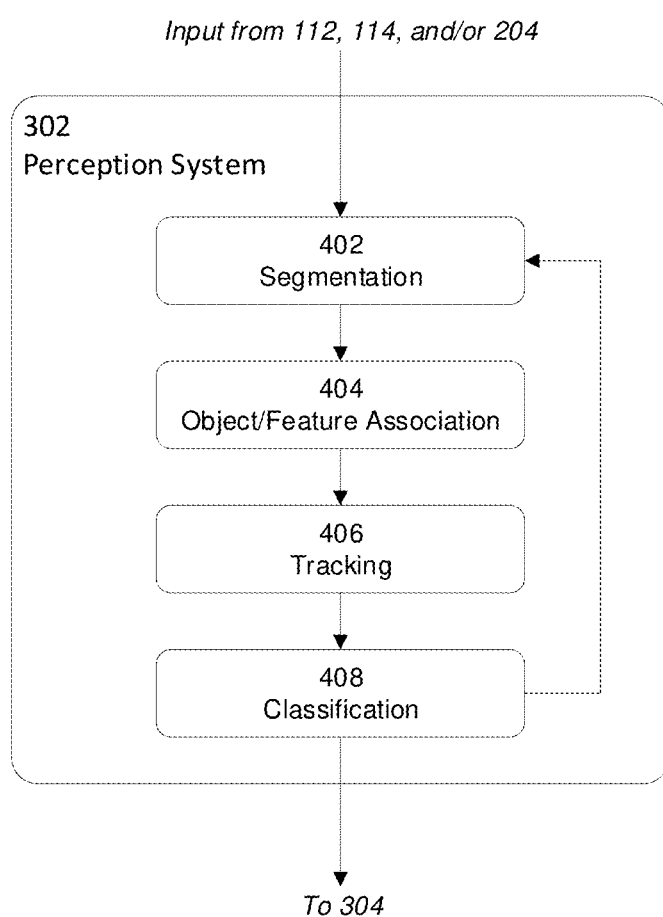
FIG. 4 shows an exemplary diagram of a perception system according to some aspects.

FIG. 4 shows an exemplary block diagram 400 providing further details of perception system 302 according to some aspects. As discussed in FIG. 3, one or more processors 102 in the data acquisition processor 214 may include a perception system 302 that may identify and/or track one or more objects and/or features (either in an external environment or internal environment) that may affect vehicle 100.

According to some aspects, the perception system 302 may include a segmentation component 402, an object/feature association component 404, a tracking component 406, and a classification component 408. The perception system 302 may receive data from one or more data acquisition devices 112, one or more position devices 114, and/or map data from map DB 204 as input. The perception system 302 may use these inputs in determining objects and/or behaviors of different objects in the external and/or internal environment to the vehicle 100. According to some aspects, the perception system 302 may iteratively processes the input data to detect, track, and classify objects identified from the input data.

The segmentation component 402 may process the received input data to determine potential objects and/or features within the external and/or internal environment, for example, using one or more object detection systems. The object/feature association component 404 may receive data about the determined objects and/or features and analyze prior object/feature instance data to determine a most likely association of each determined object/feature with a prior object/feature instance, or in some cases, determine if the potential object/feature is a new object/feature instance. The tracking component 406 may determine the current state of each object/feature instance, for example, in terms of its current position, velocity, acceleration, heading, orientation, uncertainties, and/or the like. The tracking component 406 may be further configured to track a change in state of an object/feature over time, e.g., over multiple video frames provided by one or more cameras. The classification component 408 may receive the data from tracking component 406 and classify each of the object/feature instances. For example, classification component 408 may classify a tracked object/feature as an object/feature from a predetermined set of objects/features and actions taken based on the tracked objects/features, e.g., driver in alert position, driver texting, etc. Classification component 408 may also provide feedback for the training of the segmentation component 402. Perception system 302 may provide the object/feature and state data for use by various other systems within vehicle 100, such as prediction system 304.

Autonomous driving may be improved by considering a predicted trajectory of perceived objects or traffic participants. The determination of the state of a vehicle may include predicted trajectories for a period of time in the future. For example, the period of time in the future may be a time horizon of 2-5 seconds. If the predictive model predicts an object trajectory that puts the vehicle in an unsafe state at a point in time in the future, the vehicle may decelerate at the current point in time. Parametric models, may determine the vehicle is in a safe state at a current point in time. However, predictive models may instruct a vehicle to decelerate to avoid a collision at a future point in time. This may be achieved without significant alterations to existing autonomous driving systems by extending the parametric model with the predictive model.

Predicted trajectories of perceived objects may be used to improves parametric safety models such as Responsibility-Sensitive Safety (RSS) models. Predicted trajectories may be used in conjunction with RSS models. For example, when an RSS determines a safe situation, the safe determination may trigger the predictive extension to use the predicted trajectories of traffic participants to determine if the situation is safe. This further check of the ego vehicle safety envelope can only improve AV driving. While an incorrect prediction might lead to some unnecessary deceleration maneuvers, it will not jeopardize the safety of the vehicle.

RSS models may incorporate predicted behavior with parametric motion models to determine the state of a vehicle. There are situations in which the RSS model for autonomous vehicle (AV) driving policies cannot avoid collisions. However, these situations may be foreseeable. To avoid these foreseeable situations, existing parametric models may include behavior predictions determined by the AV processing pipeline. If the state of the ego vehicle is unsafe, appropriate countermeasures are proposed. If the parametric model determines the state of the ego vehicle is safe, the predictive model may double check using predicted trajectories to determine the state of the vehicle. If the predictive model determines the vehicle is safe, nothing further is required. If the predictive model determines the vehicle is unsafe, the predictive model may provide the unsafe state to the parametric model or generate a vehicle response.

Alternatively, the predictive model may operate independently of the parametric model to avoid occupying computational resources required by the parametric model. If the models operate independently, the predictive model may determine a vehicle state for all situations regardless of the parametric model determination.

Below are examples of situations that may be improved by extending parametric models with predictive models.

Figure 5A:
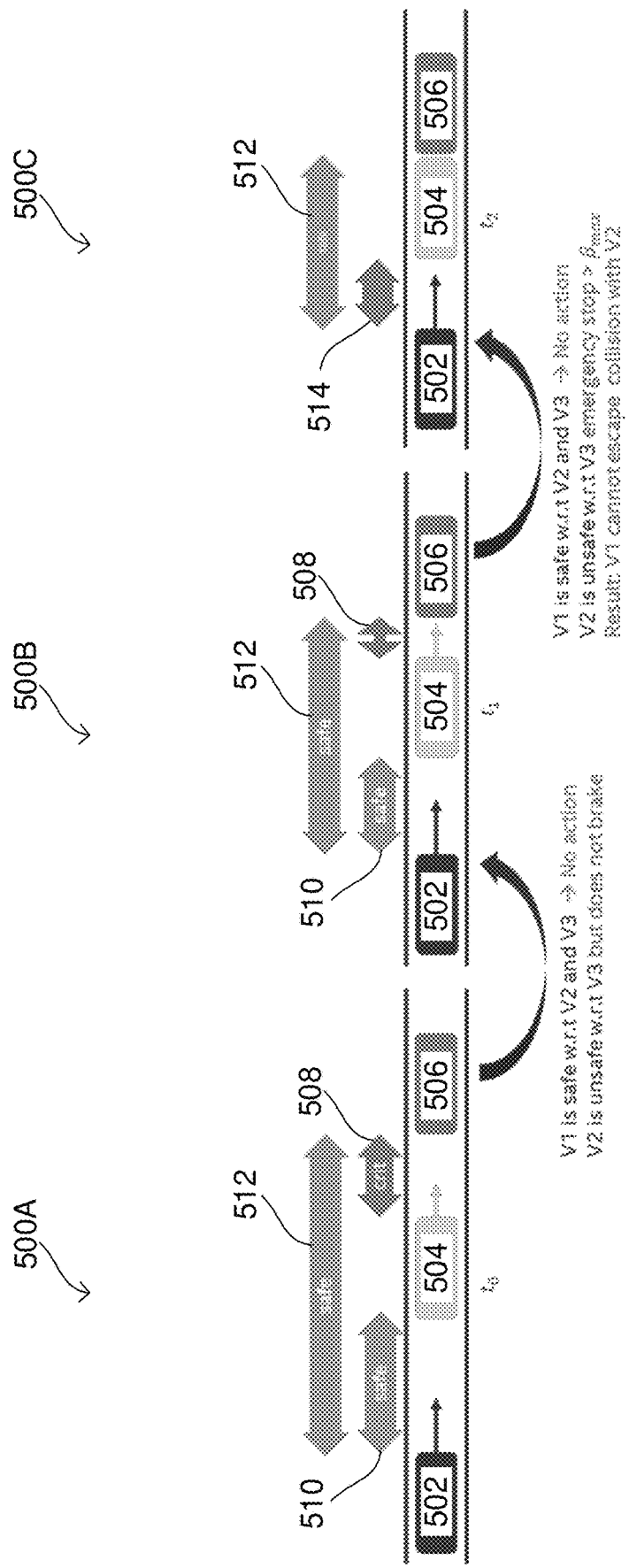

FIGS. 5A and 5B illustrate scenarios where an autonomous vehicle's safety driving model may not avoid a collision. FIG. 5A illustrates a scenario at three different points in time 500A, 500B and 500C. 500A illustrates three vehicles, vehicle one 502, vehicle two 504, and vehicle three 506 at a first point in time. At time 500A vehicle 502 is not at risk of colliding with vehicle 504 as illustrated by safe distance 510. Additionally, vehicle 502 is not at risk of colliding with vehicle 506 as illustrated by safe distance 512. Therefore, vehicle 502 requires no action. However, vehicle 504 is at risk of colliding with vehicle 506 illustrated by critical distance 508, but vehicle 504 does not reduce its speed. Time 500B illustrates a second point in time. Vehicle 502 is still not at risk of colliding with vehicles 504 and 506. Vehicle 504 brakes in order to avoid a collision with vehicle 506. Time 500C illustrates the result of vehicle 504 braking to avoid collision with vehicle 506. As a result the safe distance 510 between vehicles 502 and 504 becomes critical distance 514. Vehicle 502 is unable to avoid a collision with vehicle 504 at critical distance 514. If, at time 500A, vehicle 502 predicted that vehicle 504 would reduce its speed to avoid collision with vehicle 506, vehicle 502 could have taken action earlier and avoided a collision with vehicle 504.

FIG. 5B illustrates a scenario at two different points in time 501A and 501B. 501A illustrates vehicle 503 at a safe distance 507 from pedestrian 505 at a first point in time. Vehicle 503 is driving along road 511 and pedestrian 505 is walking on sidewalk 513. Vehicle 503 may not take action because it is a safe distance 507 from pedestrian 505 or because pedestrian 505 is on sidewalk 513. Time 501B illustrates a second point in time where vehicle 503 is a critical distance 509 from pedestrian 505 and pedestrian 505 has moved into road 511. At time 501B, vehicle 503 is not able to avoid a collision with pedestrian 505. If, at time 501A, vehicle 503 anticipated pedestrian 505 would walk into road 511, vehicle 503 could have taken action earlier and avoided collision with pedestrian 505.

Figure 6:
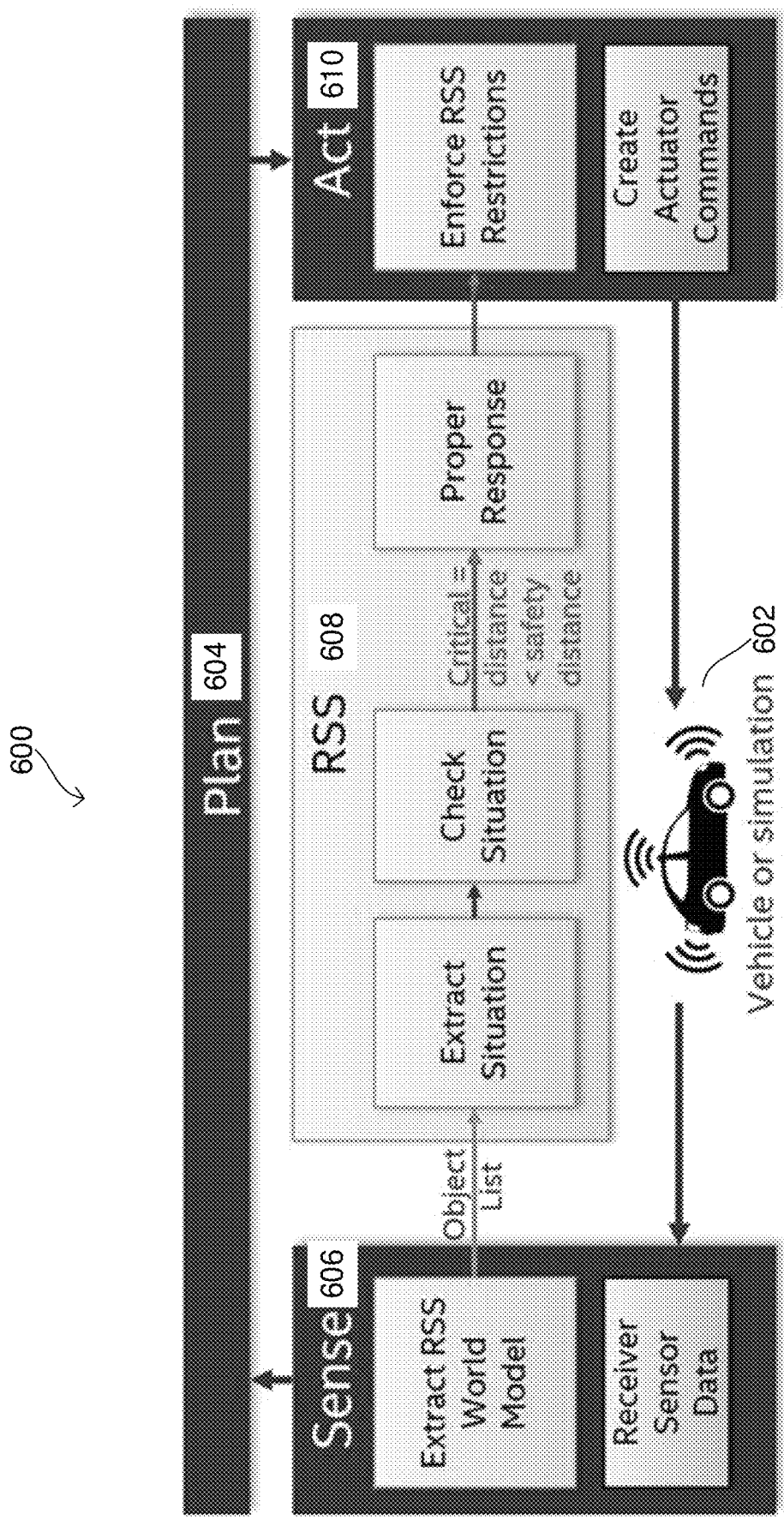
FIG. 6 shows an exemplary safety driving model flow diagram according to some aspects.

FIG. 6 illustrates an exemplary flow diagram for implementing an exemplary risk-aware safety driving system 600. In accordance with some aspects, the risk-aware safety driving model 608 may be implemented or executed by one or more processors. For example, one or more processors executing software instructions as described herein.

Sensors 606 may perceive a vehicle 602 environment based on sensed and/or perceived environmental data. Parametric model 608 may determine a vehicle state based on the environment data and generate a proper response. Plan 604 may implement an action 610 based on generated response instruction. For implementing the risk-aware safety model 608, a complete or perfect object list is needed as input to the driving safety model 608. For example, situational data and/or environmental data describe objects (e.g., traffic participants) in the vehicle's 602 traffic situation. Sensor data from vehicle 602 may be transmitted to Sensing 606 to generate a perceived vehicle environment. Other sources of data may be geographical data, e.g., GPS coordinate data, map data, or any other relevant information for describing the traffic environment and objects therein. This situational data, which includes an object list, can also include existence probabilities for each object. Further, other aspects of the situational data may be provided with uncertainties, such as, for example, probabilities with respect to position, orientation, velocities of objects described in the situational data.

As shown in FIG. 6, data describing the traffic situation may be extracted to describe the vehicle environment. An extracted situation may describe a potential conflict between an ego vehicle 602 and at least one other object. The extracted situation may be data in a form according to the safety driving model.

Extracted situations may include an intersection (right-of-way) conflict, or a leading/approaching-vehicle conflict. Each situation may be checked to determine the state of the vehicle. This may include implementing the method depicted in FIG. 7, which will be described in greater detail below. The parametric model evaluates the extracted situation using different combination of ego behaviors and other object (e.g., other traffic participants such as vehicles, bicyclists, pedestrians, etc.) actions or behaviors.

The proposed disclosure may improve the achievable safety of a parametric model such as RSS, without reducing practicability. RSS is a formal mathematical model for the safety of AV behavior planning. RSS covers five key rules:
 1. Do not hit someone from behind
 2. Do not cut-in recklessly
 3. Right-of-Way is given, not taken
 4. Be careful in areas with limited visibility
 5. If you can avoid a crash without causing another, you must Each of these rules is described through a set of parameterizable mathematical equations. The parametric model 608 determines the state of the AV based on these rules. If the state is unsafe, RSS provides restrictions of the actuator control commands, that should bring the AV back into a safe state. For example, the generating a deceleration command for the ego vehicle to avoid a collision with a traffic participant. Consequently, parametric models can be used as an independent safety model for the behavior planning components inside an AV driving system 600, as illustrated in FIG. 6.

Figure 7:
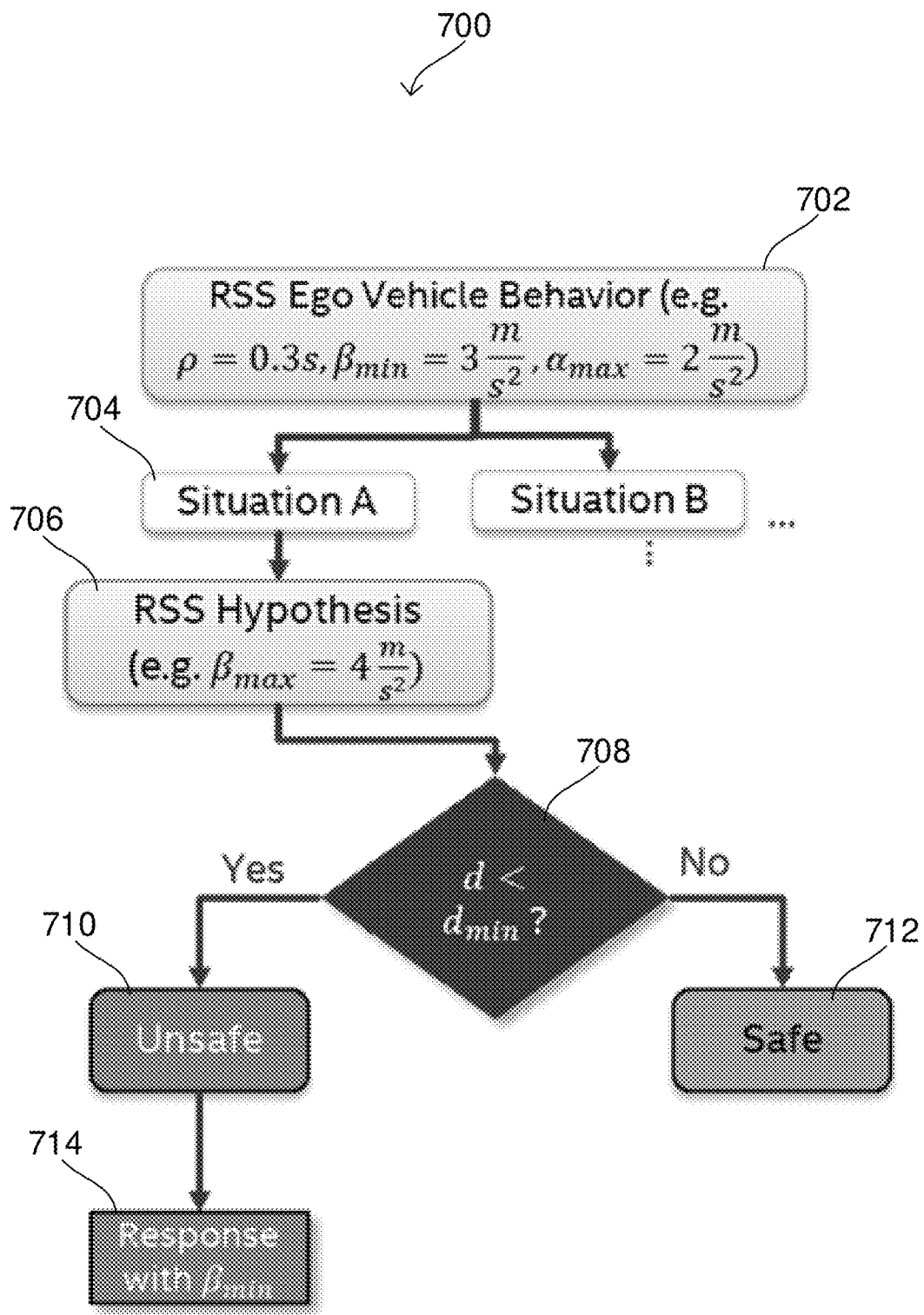
FIG. 7 shows an exemplary flow diagram for determining a vehicle stat according to some aspects.

FIG. 7, shows flow diagrams illustrating a method 700 for evaluating combinations of ego vehicle behavior and perceived objects. The method of FIG. 7 may be implemented by one or more processors of the ego vehicle. First, the parts of each combination are selected, e.g., a driving behavior 702 (e.g., behavior of ego vehicle), a traffic situation 704 (previously extracted from situation data), and object hypothesis 706 (e.g., behavior of traffic participant). In the example of FIG. 7, a vehicle behavior or ego vehicle behavior is selected at 702, e.g., selected from a data set of possible vehicle behaviors.

According to some aspects, the ego vehicle behaviors may be described through the given parameters (e.g., driving model parameters), which can be stored in a database. For the object hypotheses 706, the actions or movements for a traffic participant may be obtained through sensor data and behavior prediction, including, for example worst case predictions.

A situation is selected at 704, from a set of possible situations. As described herein, traffic situations may be determined and/or extracted from obtained situational data e.g., sensor data. Each traffic situation may include at least one other traffic participant, that is the data representing the extracted traffic situation may define a traffic participant. A situation may reflect a current or near current situation.

At 706, one object hypothesis for the traffic participant is selected from a set of possible hypothesis. As described herein, an object hypothesis can include a defined action of a traffic participant for an extracted situation. An object hypothesis may include data defining a behavior of another vehicle, a vehicle other than the ego vehicle in a situation. For example, object hypothesis may include behaviors for other vehicles such as, accelerating, decelerating, breaking, stopping, changing lanes, turning, exiting, etc. Other behaviors, such as, movement behaviors, may be defined for other traffic participants such as pedestrians, bicyclists, animals, etc.

After a combination has been chosen, e.g., a unique selection of a behavior, a situation, and an object hypothesis from steps 702 to 706, a minimum safe distance value may be determined or estimated. The minimum safe distance may be the minimum distance required between the ego vehicle and an object given the selected combination.

At 708, the minimum safe distance is compared to a sensed distance between the ego vehicle and an object (e.g., another vehicle or traffic participant). A vehicle state is determined based on the comparison. If the sensed distance is less than the minimum safe distance, the vehicle is determined unsafe 710. Unsafe determination 710 triggers a vehicle response 714. For example, the ego vehicle may have to decelerate at a minimum deceleration rate. If the sensed distance is greater than the minimum safe distance, the vehicle is determined safe 712 and the ego vehicle may not require an action. This process can be repeated for other unique combinations and behaviors and situations.

As an example, if the rule "do not hit someone from behind" is violated, the vehicle is unsafe and a proper response is required. The situation may be expressed as vehicles should maintain a safe longitudinal distance among each other. The safe longitudinal distance allows a following vehicle to react to sudden braking maneuvers of a leading vehicle. This can be expressed through a parametric model defining the minimum safe longitudinal distance between two vehicles, which is:

$$d_{min} = v_r \rho + \frac{1}{2} \alpha_{max} \rho^2 + \frac{(v_r + \rho \alpha_{max})^2}{2\beta_{min}} - \frac{v_f^2}{2\beta_{max}}$$

In the above equation, $\rho$ refers to the reaction time of the following vehicle, $\alpha_{max}$ is the maximum acceleration of the following vehicle during its reaction time, $\beta_{min}$ is the minimum braking force that the following vehicle has to apply after the reaction time, and $v_r$ is its current velocity. Similarly, $v_f$ is the velocity of the leading vehicle, and $\beta_{max}$ is the maximum braking force expected of the leading vehicle.

For example, if the ego vehicle is considered to be in an unsafe situation (i.e. one of the aforementioned rules is broken), the parametric model provides a proper response. This is a restriction of the actuator control commands, that should bring the ego vehicle back into a safe state. In the longitudinal example this means that when the distance between the two vehicles is less than $d_{min}$, the parametric model will require the following vehicle to decelerate with at least $\beta_{min}$, to avoid being the cause of a collision.

An exemplary method of a decision making process of a parametric model as illustrated in FIG. 7, may determine a vehicle state based on a longitudinal distance between two vehicles. As shown in FIG. 7, an RSS may analyze all situations based on the parametric models, to determine if the ego vehicle is in a safe or unsafe state. The RSS may determine if the vehicle is safe based on a the distance between the vehicle and any other object within the vehicle environment. The steps of FIG. 7 may be repeated for each object within the vehicle environment.

Parametric safety models, such as RSS models, are rooted in model assumptions. For example, in constant-acceleration models, it is assumed a leading vehicle will not decelerate with more force than $\beta_{max}$. If a leading vehicle decelerates with more force than $\beta_{max}$, the parametric safety model of the following vehicle is not able to cope with this situation and avoid a collision as shown in FIG. 5A.

Figure 8:
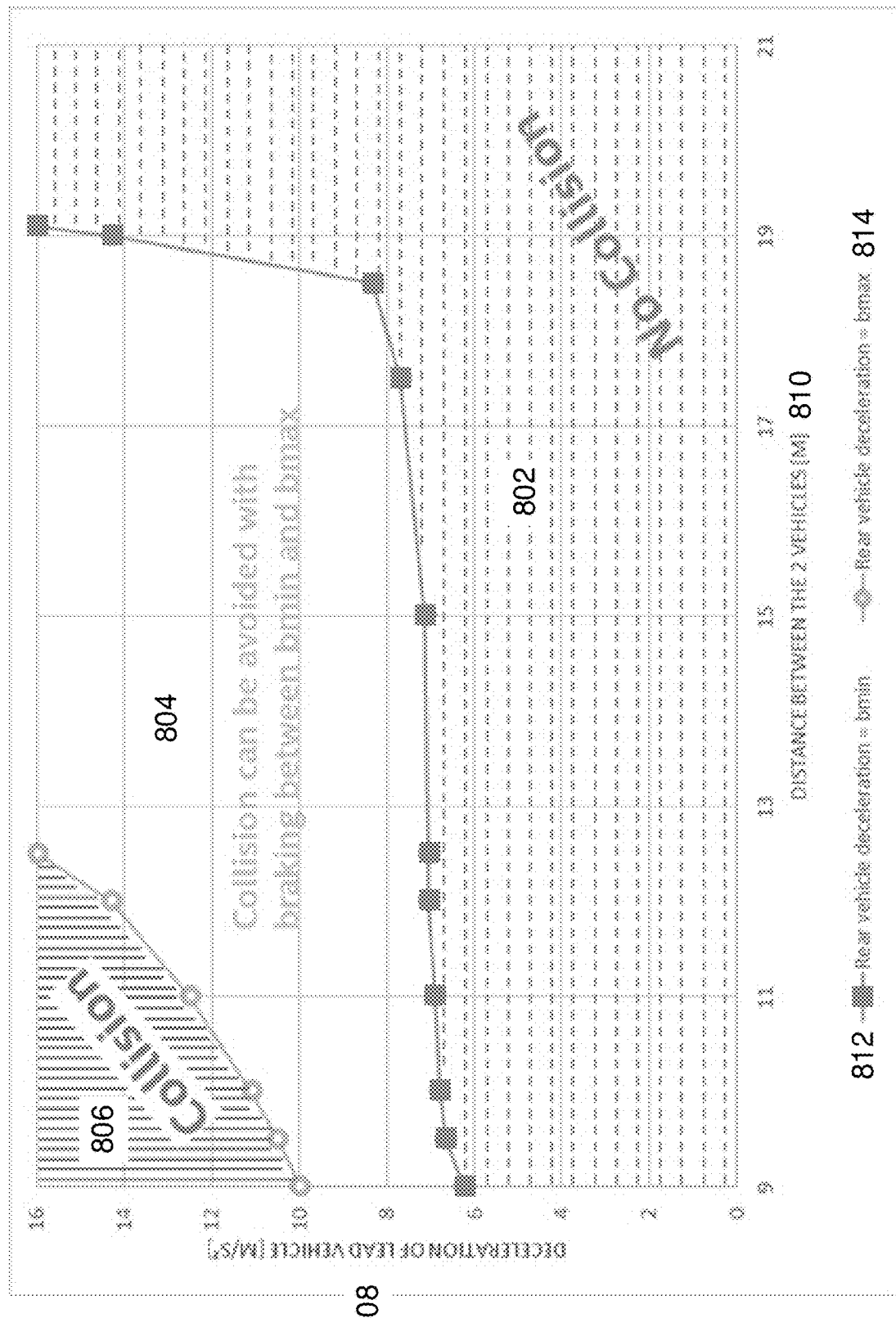
FIG. 8 shows an exemplary chart of safety model collision results according to some aspects.

FIG. 8 illustrates possible results of a Responsibility-Sensitive Safety (RSS) model implementation, is illustrated in FIG. 7, for two vehicles. A distance between a leading vehicle and a following vehicle may be used to determine whether the following vehicle (ego vehicle) is in a safe state. For example, the chart of FIG. 8 illustrates an evaluation using an open source RSS implementation in combination with the vehicle simulator (CARLA). For this evaluations, $\beta_{max}$ was set to 6.5 m/s², $\beta_{min}$ is between 4 and 6.5 m/s², and the leading and following vehicles have a starting velocity of 10 m/s. As can be seen, there is a clear cut-off line between the situations where the RSS can avoid collisions and situations where it cannot avoid collisions.

Unavoidable collision are more pronounced when model assumptions are based on expected properties instead of physical properties. For example, modern vehicles can decelerate at more than 14 m/s², while a maximum recommended deceleration value $\beta_{max}$ may be 6-7 m/s².

The vertical axis 808 represents a deceleration of the lead vehicle. The horizontal axis 810 represents the distance between the leading vehicle and the following vehicle. Line 812 represents a minimum deceleration required by the following vehicle to avoid a collision. Line 814 represents a maximum deceleration required by the following vehicle to avoid a collision with the leading vehicle. The larger the distance between the two vehicles, the less likely there will be a collision. Area 802 represents a situation where following vehicle does not have to act in order to avoid a collision. For example, the two vehicles are far enough apart that even if the lead vehicle decelerates there is no immediate risk of collision. Area 804 represents a situation where the lead vehicle decelerates and the distance between the two vehicles is large enough that the following vehicle can decelerate between minimum deceleration 812 and maximum deceleration 814 to avoid a collision with leading vehicle. Area 806 represents a situation where the leading vehicle decelerates and the following vehicle cannot avoid a collision. For example, even if the following vehicle decelerates at maximum deceleration 814, the distance between the two vehicles is too small and/or the deceleration of the lead vehicle is too great for the following vehicle to avoid collision with the leading vehicle.

When evaluating the safe longitudinal distance between a leading vehicle and a following vehicle, there are four general situations:
1. The leading vehicle decelerates with less than $\beta_{max}$, and the RSS model is able to avoid collisions between the leading vehicle and the following vehicle (Area 802).
2. The leading vehicle decelerates with greater than $\beta_{max}$, but the distance between the two cars is large enough that $\beta_{min}$ is enough for the following vehicle to avoid a collision. The RSS can avoid a collision (Area 802).
3. The leading vehicle decelerates with greater than $\beta_{max}$, and the distance between the two cars is not large enough to allow the following vehicle to decelerate with $\beta_{min}$. However, a collision is avoided if the following vehicle decelerates with at most $\beta_{max}$. The RSS with an adaptive braking mechanism can avoid a collision (Note that RSS only states that the following vehicle should decelerate with at least $\beta_{min}$ and at most $\beta_{max}$) (Area 804).
4. The distance between the leading vehicle and the following vehicle is too small to avoid a collision when the following vehicle decelerates with $\beta_{max}$ (Area 806).

Similarly, the model assumption states that a pedestrian on the sidewalk at a point other than a crosswalk is not considered. However, this may lead to the situation shown in FIG. 5B, where the pedestrian walks into the street at an unexpected point and the vehicle does not have time to react and cannot avoid the collision with the pedestrian.

Violations of the model assumptions may be foreseeable or detectable using comprehensive intent/behavior prediction approaches used in AV planning modules.

To illustrate this further, as shown in FIG. 5B, the behavior of the pedestrian (speed, heading, orientation, etc.) indicates that the pedestrian has not realized a vehicle is approaching. As a result, AV behavior prediction may predict a trajectory for the pedestrian that puts the pedestrian in the road and contradicts the RSS model assumption.

Additionally, as shown in FIG. 5A, there is a stopped vehicle 506, which is not realized by vehicle 504. As a result, 504 will not brake smoothly (according to the RSS assumptions), but it will brake very late and much harder than RSS anticipates. As a result, the safety model of the ego vehicle (502) cannot cope with this hard braking maneuver. However, if ego vehicle 502 senses 504 and 506, the behavior prediction will anticipate that 504 will brake and therefore create a stopping trajectory for 504. Hence, in both cases the behavior prediction produces output, which extends and completes the model assumptions of RSS.

Figure 9:
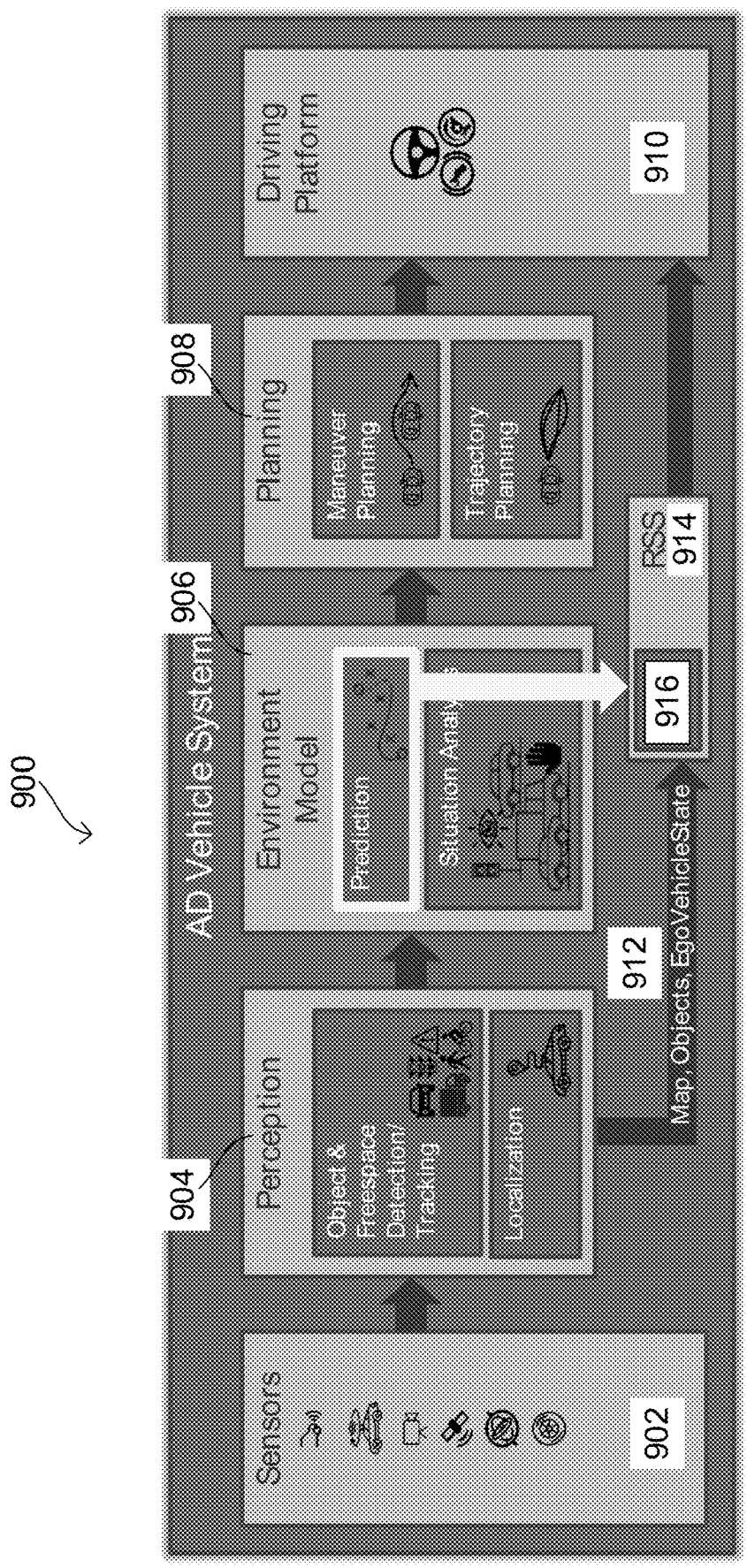
FIG. 9 shows an exemplary components of a vehicle safety system according to some aspects.

FIG. 9 illustrates an autonomous vehicle system 900. System 900 may be similar to the system of vehicle 100 described with regards to FIGS. 2 and 3. However, system 900 may include prediction model 916 to extend parametric model 914. Prediction model 916 may access all information provided to parametric model 914. Details of how prediction model 916 uses prediction information for environment model 906 is described in further detail with regards to FIGS. 10A and 10B below. Sensors 902 sense the vehicle environment and provide data to the perception model 904. Model 904 perceives a vehicle environment based on the provided data. For example, perception model 904 may perceive other traffic participants or obstacles within the vehicle environment. The perceived data (e.g., maps, objects, vehicle stat) is provided to parametric model 914 and environment model 906. Environment model 906 may determine predictions for objects perceived in model 904 and conduct situation analysis as described in FIG. 7. Model 906 provides the generated prediction and situation data to parametric model 914 and planning model 908. Parametric model 914 may implement a prediction model 916 which foresees situations based on the provided prediction and situation data. Parametric model 914 and/or prediction model 916 may generate a vehicle response instruction and provide it to driving platform 910.

Parametric model may incorporate a prediction model to determine a vehicle state based on a perceived vehicle environment, predictions, and situations. The parametric model, such as a RSS model, may receive prediction information for each object within the vehicle environment. The prediction information may already be calculated by the environment model. The prediction model of the RSS model may improve the RSS model by incorporating the existing prediction information calculated by the environment model to determine the state of the vehicle. In addition to the prediction information, standard inputs, such as map information, object positions, object velocities, object orientations, and ego vehicle information are input in to the parametric model. The ego vehicle information may include the vehicle's position, orientation, and/or velocity. The prediction model uses both prediction information and standard inputs to determine the state of the ego vehicle.

Minimal modifications to existing AV driving systems are required by using information already available from the main processing pipeline. The main processing pipeline may have more resources to perform sophisticated and reasonable behavior prediction calculations. For example, the AV driving system main process pipeline may be coupled to accelerators, and high-performance processors. Because parametric implementing parametric models frequently run on reduced performance chips, such as certified function safety (FuSa) chips, additional computations may jeopardize the parametric model's computational requirements.

The prediction model extending the parametric model may determine the vehicle is unsafe in non-safety critical situations. If a prediction is wrong, at most an unnecessary deceleration response instruction may be generated, and still within the limits of the parametric model. For example, a braking force between $\beta_{min}$ and $\beta_{max}$. This result is similar to an existing AV driving system perceiving an object that is does not exist and the parametric model generates a deceleration response. However, if the parametric model determines a situation as safe, and the prediction model correctly determines the vehicle is unsafe, an appropriate response can be initiated and avoid a collision that would have otherwise occurred.

Predicted object behavior is typically available in a form of trajectory T, where T is defined as follows:

$$T = \{(p_i, v_i) | p_i \text{ is a future position} \in \mathbb{R}^3 \wedge v_i \text{ is a future velocity} \in \mathbb{R}^3 \text{ at } p_i\}$$

Where both $p_i$ and $v_i$ may be elements of the set of ordered triples of real numbers. For example, vectors including 3 components.

Predicted trajectories may be provided in a time-equidistant form. For example, the time required for the object to travel from $(p_i, v_i)$ to $(p_{i+1}, v_{i+1})$ is the same, for all i. And the time horizon for the prediction is typically limited to a few seconds (2-5 seconds). However, other motion representation may also be considered. Any motion representation that provides the ability to determine an object's position and orientation at a specific point in time may be used.

The prediction model may incorporate information that traffic participants generate. For example, other vehicles or traffic infrastructure may generate information including a prediction of the vehicle/traffic participant's behavior. A V2X solution improves the safety layer (parametric model) of an AD vehicle system by incorporating traffic participant information. However, the safety layer is not dependent on a V2X connection because without the additional information the system remains as safe as defined by a standard RSS approach.

Figure 10A:
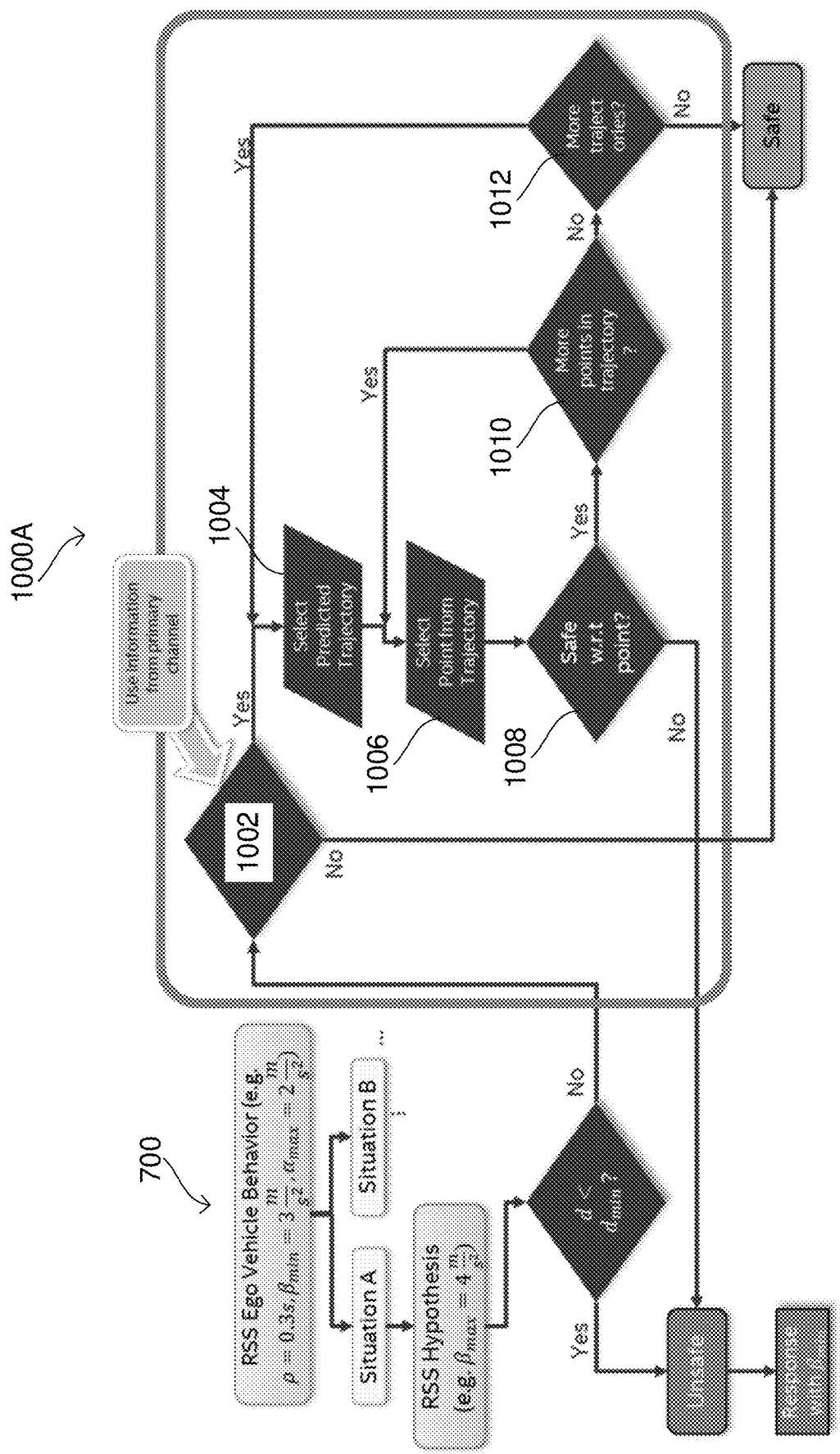
FIGS. 10A and 10B show exemplary safety driving models including predicted motion trajectory according to some aspects.
Figure 10B:
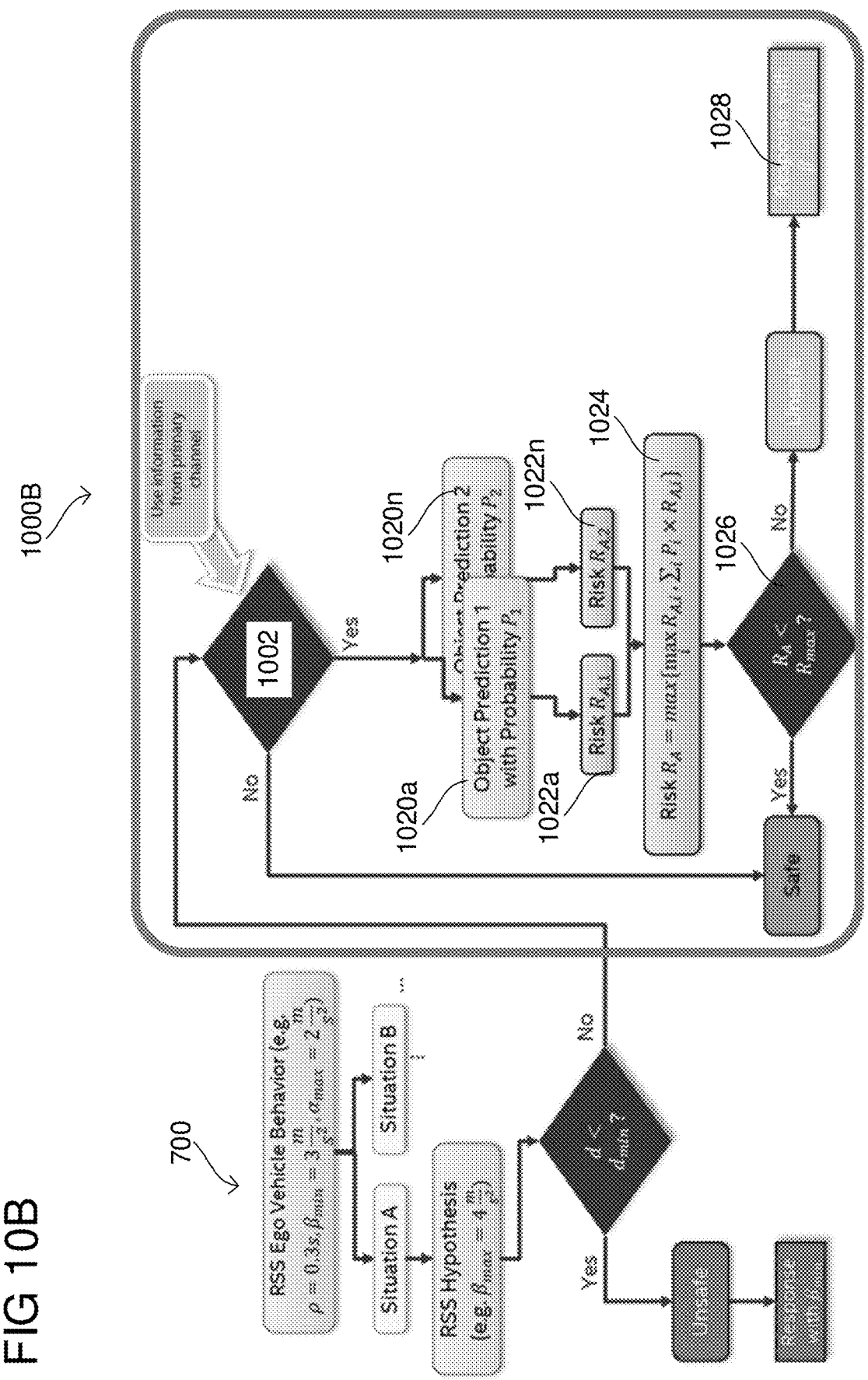

FIGS. 10A and 10B illustrate a prediction model, for example, prediction model 916 extending parametric model 914. FIG. 10A illustrates prediction model 1000A. Prediction model 1000A may receive a vehicle state determination from RSS method 700 to trigger the process of prediction model 1000A. Otherwise, prediction model 1000A may receive data directly from perception and environment models as previously described and determine a vehicle state based on the data. At 1002, prediction model 1000A determines if a perceived object may have one or more predicted trajectories different from the projected trajectory determined at an environment model. If there are no alternate trajectories, the vehicle is determined to be safe. If there are alternate trajectories, a predicted trajectory of an object is selected at 1004. At 1006 a point of the predicted trajectory is selected. At 1008, the selected point from 1006 is evaluated with respect the vehicle and determines if the vehicle is safe with respect the point in the trajectory. If 1008 determines the vehicle is not safe, a signal indicating the vehicle state may be transmitted to method 700. Method 700 may then generate a vehicle response instruction based on the state determined by prediction model 1000A. If 1008 determines the vehicle is safe, 1010 determines if there are any unevaluated points along the predicted trajectory. If 1010 determines there are unevaluated points, they are evaluated by repeating steps 1006 and 1008. If 1010 determines there are not unevaluated points, 1012 determines if there are any unevaluated predicted trajectories for the object. If 1012 determines there are unevaluated trajectories, they are evaluated by repeating steps 1004, 1006, and 1008. If 1010 determines there are no unevaluated trajectories, 1000A determines that the vehicle is in a safe state and no action is required to avoid a collision. Alternatively, prediction model 1000A may generated a vehicle response instruction and provide it to a driving platform.

An AD system may transmit prediction information from the environment model to the safety model (such as a parametric model) as illustrated in FIG. 9. The standard safety model may operate with or without a prediction model. If the safety model determines the vehicle is in an unsafe state, the prediction model is not triggered. If the safety model determines the vehicle is in a safe state, the prediction model is triggered.

The prediction model processes each perceived object at all points $(p_i, v_i)$ from predicted trajectories to determine if the vehicle is safe. If the vehicle is determined unsafe with respect to any of the perceived object, the prediction model triggers the safety model's unsafe response. Otherwise, the vehicle is determined to be safe and no response is required.

For example, to determine the vehicle is safe with respect to a point $(p_i, v_i)$, the prediction model or the safety model may use the following equation to determine if a vehicle can stop before reaching the point at the corresponding time the object is at that point.

A vehicle is longitudinally safe, if:

The longitudinal distance to point $(p_i, v_i)$ is larger than the stopping distance of the vehicle defined by $$v\rho + \frac{1}{2}\alpha_{max}\rho^2 + \frac{(v + \rho\alpha_{max})^2}{2\beta_{min}},$$

or

The vehicle passes the point $(p_i, v_i)$ before the other traffic participant reaches this point, for all possible motions of the vehicle.

Lateral conflicts may also be processed by similar mathematical formulas. It should be understood that a safety model may use other mathematical formulas to determine safety.

Furthermore, prediction information may be limited to a reasonable time horizon, such as 2-5 seconds. Otherwise computation time might increase to unacceptable levels, or an unreasonably high ratio of unsafe determinations would be returned.

FIG. 10B illustrates another aspect according to prediction model 1000B. Similar to prediction model 1000A of FIG. 10A, prediction model 1000B may receive a vehicle state determination from RSS method 700 to trigger the process of prediction model 1000B. Otherwise, prediction model 1000B may receive data directly from perception and environment models as previously described and determine a vehicle state based on the received data. At 1002, prediction model 1000B determines if a perceived object may have one or more projected trajectories different from the projected trajectory determined at an environment model. At 1020a-n, prediction model 1000B determines a probability for each of the one or more projected trajectories determined at 1002. At 1022a-n, prediction model 1000B determines a risk associated with a different combination having a different selected object hypotheses for a given ego behavior and a given situation, including predicted trajectory, which produces respective risk values. At 1024, prediction model 1000B determines the maximum risk for the situation is evaluated based on the risks determined at 1022a-n. The maximum risk determined at 1024 is compared with a risk threshold at 1026. If the risk threshold is less than the maximum risk, prediction model 1000B determines the vehicle is safe. If the risk threshold is greater than the maximum risk, prediction model 1000B determines the vehicle is unsafe. If the vehicle is determined to be unsafe, prediction model 1000B may generate a vehicle response instruction at 1028. For example, prediction model 1000B may generate a response instruction to decelerate the vehicle.

A perceived object may include multiple predicted trajectories. Incorporating a probability for each predicted trajectory may reduce unnecessary computations. If the probability of a trajectory is below a predetermined threshold hold value, the prediction model may ignore that trajectory. The standard safety layer flow maintains its safety level, the prediction model only improves the safety layer without replacing it.

The prediction model may obtain a risk of collision for each predicted trajectory of a perceived object. Predicted trajectories do not have to be processed separately if one of the predicted trajectories may lead to an unsafe state. Therefore, any risk-model, such as Time-To-Collision, may be used to determine the overall risk. For example, if the individual risk $R_{A,i}$ for predicted trajectory I for situation A, the overall risk for this situation can be obtained by the following equation:

$$\text{Risk } R_A = \max\left\{\max_i R_{A,i}, \sum_i P_i \times R_{A,i}\right\}$$

The probability for a predicted trajectory as represented by ($P_i$) is included in the computation of risk.

The overall risk may not be simply the weighted average overall independent risks. More sophisticated calculations may be employed, such as the one previously described, where the worst-case risk is considered. This approach considers the overall risk associated with a perceived object and its predicted behaviors is considered and its possible worst-case predicted trajectory. This approach may be used for lateral and longitudinal conflicts.

The prediction model may compare the overall risk value for the current situation with a risk threshold $R_{max}$ to determine if a vehicle is safe or unsafe at the current situation. $R_{max}$ is a new parameter of the safety layer. $R_{max}$ may be set by an industry standard or governmental agency to reflect an acceptable level of risk for an AV. The risk threshold may be dependent on a variety of factors such as situation, road, environment, etc.

If the risk comparison determines that the vehicle situation is unsafe, a proper vehicle response instruction or countermeasure is proposed. Instead of proposing the same response for all situations, such as maximum deceleration, the response may be adapted based on the value of the risk because risk is a continuous value. Therefore, for longitudinal conflicts, the braking force is adapted according to the risk level. It should be noted that the response has to be within the parameter limits of the safety layer. For example, in case of RSS, this means that braking forces are only allowed up to $\beta_{max}$, as otherwise following vehicles might be endangered.

As shown in FIGS. 10A and 10B the process flow may be repeated for different variations. This process can be repeated for other unique combinations and behaviors and situations. That, for each situation and behavior, the possible object hypothesis are considered to determine risk values, with the maximum determined risk value being used for evaluation or consideration as whether to implement the behavior for the situation.

FIG. 11 illustrates a risk dependent adaptive model 1100 for vehicle response as discussed with respect to FIG. 10B. The y-axis represents a braking force β 1110 and the x-axis represents a risk level 1112. If the risk level is below risk threshold $R_{max}$ 1106 no braking force is applied. At risk threshold $R_{max}$ 1106 a vehicle response would be to apply brake force $\beta_{min}$ 1104. As risk level 1112 increases, braking force 1110 increases until it reaches maximum braking force $\beta_{max}$ 1102. As previously stated, the vehicle response has to be within the limits of the safety layer. At point 1108 maximum braking force 1102 is reached and maintained even though the risk level may increase and the vehicle is capable of braking with a larger force.

Any risk model may be used to generate a vehicle response to an unsafe determination. For example, an uncertainty-aware collision risk model namely represented by the following formula:

$$R_e(t, \Delta t) = \tau^{-1} * I_e(t) * C_e(t)$$

With $\tau^{-1} * I_e(t)$ representing the collision probability $P_e$, a so-called collision indicator function $I_e$, which represents the likelihood of a collision using Gaussian Error functions (erf):

$$I_e = \frac{1}{2}\left[\text{erf}\left\{\frac{d_0 - d(t)}{\sqrt{2}\sigma(t)}\right\} + 1\right]$$

The collision severity $C_e$ may be set to 1, to have a similar treatment of all critical situations.

The indicator function $I_e$ depends on the distance d and distance uncertainty σ of the object at time point t, which depend on the velocity and acceleration uncertainties of the objects. Minimum distance $d_0$ is a constant reflecting the minimum distance, below which a collision event is inevitable. The distance and velocity values can be obtained through simple motion models, or directly using predicted trajectories. For example, the predicted trajectories may be used to determine distance and velocity values for perceived objects, and standard motion models may be used to determine distance and velocity values for the ego vehicle. Changes in distance and velocity can be obtained to estimate an uncertainty-aware collision risk for an ego vehicle-perceived object pair.

FIG. 12 illustrates exemplary method of determining the state of a vehicle according to some aspects. FIG. 12 shows exemplary method 1200. As shown in FIG. 12, method 1200 includes obtaining data for one or more objects in a vehicle environment of the vehicle, wherein the data comprises motion data associated with at least one object of the one or more objects (stage 1202); receiving a predicted motion trajectory for at least one object of the one or more objects (stage 1204); predicting a collision of the vehicle and the at least one or more objects (stage 1206); and generating an information that the risk exceeds the predefined risk threshold to be considered in determining the safety driving state for the vehicle (stage 1208).

FIG. 13 illustrates exemplary method of determining the state of a vehicle according to some aspects. FIG. 13 shows exemplary method 1300. As shown in FIG. 13, method 1300 includes obtaining data for one or more objects in a vehicle environment of the vehicle, wherein the data comprises motion data associated with at least one object of the one or more objects (stage 1302); receiving a predicted motion trajectory for at least one object of the one or more objects (stage 1304); determining whether a risk indicating a risk of a collision for the vehicle and the at least one or more objects exceeds a predefined risk threshold (stage 1306); and generating an information that the risk exceeds the predefined risk threshold to be considered in determining the safety driving state for the vehicle (stage 1308).

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common semiconductor chip or chassis to form an integrated element, executing discrete software components on a common processor core, etc. Conversely, skilled persons will recognize the possibility to separate a single element into two or more discrete elements, such as splitting a single circuit into two or more separate circuits, separating a semiconductor chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device.

Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

The following examples disclose various aspects of this disclosure:

In Example 1, a safety device for a vehicle including: a memory configured to store instructions; one or more processors coupled to the memory to execute the instructions stored in the memory, wherein the instructions are configured to: implement a safety driving model for the vehicle to determine a safety driving state for the vehicle, wherein the determining comprises: obtaining data for one or more objects in a vehicle environment of the vehicle, wherein the data comprises motion data associated with at least one object of the one or more objects; determining a predicted motion trajectory for at least one object of the one or more objects; determining whether a risk value indicating a risk of a collision for the vehicle and the at least one or more objects exceeds a predefined risk threshold; and generating an information that the risk exceeds the predefined risk threshold to be considered in determining the safety driving state for the vehicle.

In Example 2, the subject matter of Example 1, may optionally further include wherein the predicted motion trajectory comprises a probability value.

In Example 3, the subject matter of Examples 1 and 2 may optionally further include wherein the predicted motion trajectory is excluded based on its probability value, wherein the probability value fails to exceed a predetermined probability threshold.

In Example 4, the subject matter of Examples 1 and 3 may optionally further include a risk model, wherein the risk value is calculated based on the risk value.

In Example 5, the subject matter of Examples 1 to 4 may optionally further include wherein the risk model incorporates the probability value of the predicted motion trajectory.

In Example 6, the subject matter of Examples 1 to 5 may optionally further include wherein the safety driving state is determined as unsafe.

In Example 7, the subject matter of Examples 1 to 6 may optionally further include generating a vehicle response instruction based on the safety driving state.

In Example 8, the subject matter of Examples 1 to 7 may optionally further include wherein the vehicle response instruction is further based on the risk value.

In Example 9, the subject matter of Examples 1 to 8 may optionally further include wherein the data for one or more objects is obtained from the one or more objects.

In Example 10, the subject matter of Examples 1 to 9 may optionally further include wherein the data for one or more objects is obtained from a prediction system of the vehicle.

In Example 11, a method for determining a state of a vehicle including: obtaining data for one or more objects in a vehicle environment of the vehicle, wherein the data comprises motion data associated with at least one object of the one or more objects; receiving a predicted motion trajectory for at least one object of the one or more objects; determining whether a risk indicating a risk of a collision for the vehicle and the at least one or more objects exceeds a predefined risk threshold; and generating an information that the risk exceeds the predefined risk threshold to be considered in determining the safety driving state for the vehicle.

In Example 12, the subject matter of Example 11 may optionally further include wherein the predicted motion trajectory comprises a probability value.

In Example 13, the subject matter of Examples 11 and 12 may optionally further include wherein the predicted motion trajectory is excluded based on its probability value, wherein the probability value fails to exceed a predetermined probability threshold.

In Example 14, the subject matter of Examples 11 to 13 may optionally further include further including a risk model, wherein the risk value is calculated based on the risk value.

In Example 15, the subject matter of Examples 11 to 14 may optionally further include wherein the risk model incorporates the probability value of the predicted motion trajectory.

In Example 16, the subject matter of Examples 11 to 15 may optionally further include wherein the safety driving state is determined as unsafe.

In Example 17, the subject matter of Examples 11 to 16 may optionally further include further including generating a vehicle response instruction based on the safety driving state.

In Example 18, the subject matter of Examples 11 to 17 may optionally further include wherein the vehicle response instruction is further based on the risk value.

In Example 19, the subject matter of Examples 11 to 18 may optionally further include wherein the data for one or more objects is obtained from the one or more objects.

In Example 20, the subject matter of Examples 11 to 19 may optionally further include wherein the data for one or more objects is obtained from a prediction system of the vehicle.

In Example 21, a method for determining a state of a vehicle including: obtaining data for one or more objects in a vehicle environment of the vehicle, wherein the data comprises motion data associated with at least one object of the one or more objects; receiving a predicted motion trajectory for at least one object of the one or more objects; predicting a collision of the vehicle and the at least one or more objects; and generating an information that the risk exceeds the predefined risk threshold to be considered in determining the safety driving state for the vehicle.

In Example 22, a method for determining a state of a vehicle including: obtaining data for one or more objects in a vehicle environment of the vehicle, wherein the data comprises motion data associated with at least one object of the one or more objects; receiving a predicted motion trajectory for at least one object of the one or more objects; determining whether a risk indicating a risk of a collision for the vehicle and the at least one or more objects exceeds a predefined risk threshold; and generating an information that the risk exceeds the predefined risk threshold to be considered in determining the safety driving state for the vehicle.

In Example 23, a method for determining a safety state of a vehicle including obtaining the safety state of the vehicle; determining that the safety state is safe; obtaining data for one or more objects in a vehicle environment of the vehicle, wherein the data comprises motion data associated with at least one object of the one or more objects; selecting a predicted motion trajectory for at least one object of the one or more objects; determining whether a risk value indicating a risk of a collision for the vehicle and the at least one or more objects exceeds a predefined risk threshold; and modifying that the safety state of the vehicle is unsafe based on the risk of the collision.

In Example 24, a method for determining a state of a vehicle including: receiving the state of the vehicle; obtaining data for one or more objects in a vehicle environment of the vehicle, wherein the data comprises motion data associated with at least one object of the one or more objects; selecting a predicted motion trajectory for at least one object of the one or more objects; and determining the state of the vehicle based on the risk of the collision.

In Example 25, the subject matter of Examples 11 to 24, may optionally further include receiving the predicted motion trajectory.

In Example 26, the subject matter of Examples 11 to 24, may optionally further include determining the predicted motion trajectory.

In Example 27, the subject matter of Examples 21 to 24, may optionally further include implementing any of the Examples 12-20.

In Example 28, one or more non-transitory computer readable media comprising programmable instructions thereon, that when executed by one or more processors of a device, cause the device to perform any one of the method of Examples 11-27.

In Example 29, a system comprising one or more devices according to any of Examples 1-10, the system configured to implement a method according to any of Examples 11-27.

In Example 30, a means for implementing any of the Examples 1-10.

While aspects of the disclosure have been particularly shown and described with reference to specific implementations, it should be understood by those skilled in the art that various changes in form and detail may be made therein without departing from the spirit and scope as defined by the appended claims. The scope of the disclosure is thus indicated by the appended claims and all changes which come within the meaning and range of equivalency of the claims are therefore intended to be embraced.

What is claimed is:

1. A safety device for a vehicle comprising:
a memory configured to store instructions; and
one or more processors coupled to the memory to execute the instructions stored in the memory, wherein the processors are configured to:
implement a safety driving model for the vehicle to determine a safety driving state for the vehicle, wherein the determining comprises:
obtaining data for one or more objects in a vehicle environment of the vehicle, wherein the data comprises motion data associated with at least one object of the one or more objects;
evaluating the obtained data using a parametric model;
selecting a predicted motion trajectory for the at least one object of the one or more objects using a predictive model;
determining, based on the evaluating and the predicted motion trajectory, whether a risk value indicating a risk of collision for the vehicle and the at least one object of the one or more objects exceeds a predefined risk threshold;
generating an information for determining the safety driving state of the vehicle based on the determination that the risk of collision exceeds the predefined risk threshold; and
causing the vehicle to implement an action based on the determined safety driving state.

2. The safety device of claim 1, wherein the selecting the predicted motion trajectory comprises determining a probability value.

3. The safety device of claim 2, wherein the predicted motion trajectory is excluded based on its probability value.

4. The safety device of claim 2, further comprising a risk model, wherein the risk value is calculated based on the risk model.

5. The safety device of claim 4, wherein the risk model incorporates the probability value of the predicted motion trajectory.

6. The safety device of claim 5, further comprising transmitting a signal comprising the information for determining the safety driving state if the safety driving state is determined as unsafe.

7. The safety device of claim 6, further comprising generating a vehicle response instruction based on the safety driving state.

8. The safety device of claim 7, wherein the vehicle response instruction is further based on the risk value.

9. The safety device of claim 1, wherein the data for one or more objects is obtained from the one or more objects.

10. The safety device of claim 1, wherein the data for one or more objects is obtained from a prediction system of the vehicle.

11. One or more non-transitory computer-readable media comprising programmable instructions thereon for causing one or more processors to perform a method of:
obtaining data for one or more objects in a vehicle environment of the vehicle, wherein the data comprises motion data associated with at least one object of the one or more objects;
evaluating the obtained data using a parametric model;
selecting a predicted motion trajectory for the at least one object of the one or more objects using a predictive model;
determining, based on the evaluating and the predicted motion trajectory, whether a risk indicating a risk of a collision for the vehicle and the at least one object of the one or more objects exceeds a predefined risk threshold; and
generating an information for determining a safety driving state of the vehicle based on the determination that the risk of collision exceeds the predefined risk threshold; and
causing the vehicle to implement an action based on the determined safety driving state.

12. The one or more non-transitory computer-readable media of claim 11, wherein the selecting the predicted motion trajectory comprises determining a probability value.

13. The one or more non-transitory computer-readable media of claim 12, wherein the predicted motion trajectory is excluded based on its probability value.

14. The one or more non-transitory computer-readable media of claim 12, further comprising a risk model, wherein the risk value is calculated based on the risk model.

15. The one or more non-transitory computer-readable media of claim 14, wherein the risk model incorporates the probability value of the predicted motion trajectory.

16. The one or more non-transitory computer-readable media of claim 15, further comprising transmitting a signal comprising the information for determining the safety driving state if the safety driving state is determined as unsafe.

17. The one or more non-transitory computer-readable media of claim 16, further comprising generating a vehicle response instruction based on the safety driving state.

18. The one or more non-transitory computer-readable media of claim 17, wherein the vehicle response instruction is further based on the risk value.

19. The one or more non-transitory computer-readable media of claim 11, wherein the data for one or more objects is obtained from the one or more objects.

20. The one or more non-transitory computer-readable media of claim 11, wherein the data for one or more objects is obtained from a prediction system of the vehicle.

* * * * *